(12) United States Patent
Kaneko

(10) Patent No.: US 6,913,363 B2
(45) Date of Patent: Jul. 5, 2005

(54) VARIABLE GEOMETRY MIRROR HAVING HIGH-PRECISION, HIGH GEOMETRY CONTROLLABILITY

(75) Inventor: Shinji Kaneko, Kokubunji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/658,475

(22) Filed: Sep. 9, 2003

(65) Prior Publication Data

US 2004/0047051 A1 Mar. 11, 2004

Related U.S. Application Data

(62) Division of application No. 10/245,665, filed on Sep. 17, 2002, now Pat. No. 6,682,199.

(30) Foreign Application Priority Data

Sep. 17, 2001 (JP) ....................................... 2001-282296

(51) Int. Cl.[7] .............................................. G02B 7/182
(52) U.S. Cl. ........................ 359/872; 359/224; 359/291
(58) Field of Search ........................ 359/872, 846–851, 359/223–225, 230–232, 291–292; 310/309, 328, 366; 29/25, 35

(56) References Cited

U.S. PATENT DOCUMENTS

| | | | |
|---|---|---|---|
| 4,441,791 A | * | 4/1984 | Hornbeck .................... 359/295 |
| 4,522,472 A | * | 6/1985 | Liebert et al. .............. 359/296 |
| 4,615,595 A | | 10/1986 | Hornbeck |
| 4,706,374 A | * | 11/1987 | Murakami .................... 438/52 |
| 4,710,732 A | | 12/1987 | Hornbeck |
| 4,943,750 A | * | 7/1990 | Howe et al. ................. 310/309 |
| 5,115,292 A | | 5/1992 | Takebe et al. |
| 5,331,454 A | * | 7/1994 | Hornbeck .................... 359/224 |
| 5,447,600 A | | 9/1995 | Webb |
| 5,512,374 A | | 4/1996 | Wallace et al. |
| 5,585,956 A | | 12/1996 | Lee et al. |
| 6,147,789 A | | 11/2000 | Gelbart |

FOREIGN PATENT DOCUMENTS

JP 2-101402 4/1990

\* cited by examiner

*Primary Examiner*—Mohammad Sikder
(74) *Attorney, Agent, or Firm*—Scully, Scott, Murphy & Presser

(57) ABSTRACT

A flexible thin film is supported by a frame member through two end portions opposing each other. A reflection surface is provided on the flexible thin film to reflect light. A first electrode is provided integrally with the flexible thin film. A second electrode is substantially fixed to the frame member so as to oppose the first electrode on an opposite side of the reflection surface. A third electrode is substantially fixed to the frame member so as to oppose the first electrode on the same side as the reflection surface. An optical opening for introducing light into the reflection surface is provided on the side of the reflection surface. At least one of the second and third electrodes is divided in the direction connecting the two end portions. The configuration of the reflection surface is controlled to a desired configuration by applying a desired voltage selectively to between the first electrode and the divided second or third electrode.

13 Claims, 15 Drawing Sheets

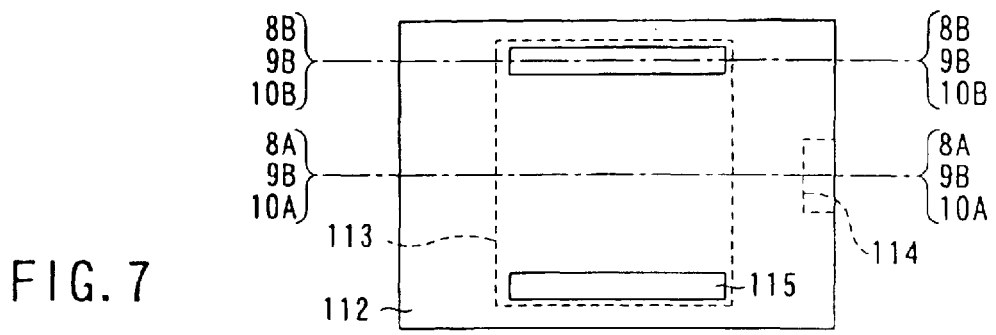
FIG. 7
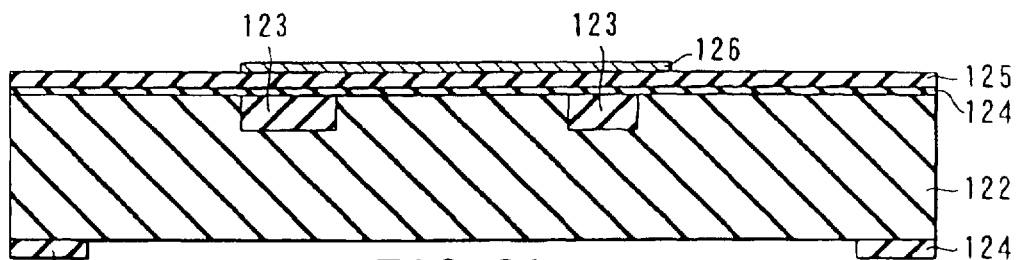
FIG. 8A
FIG. 8B
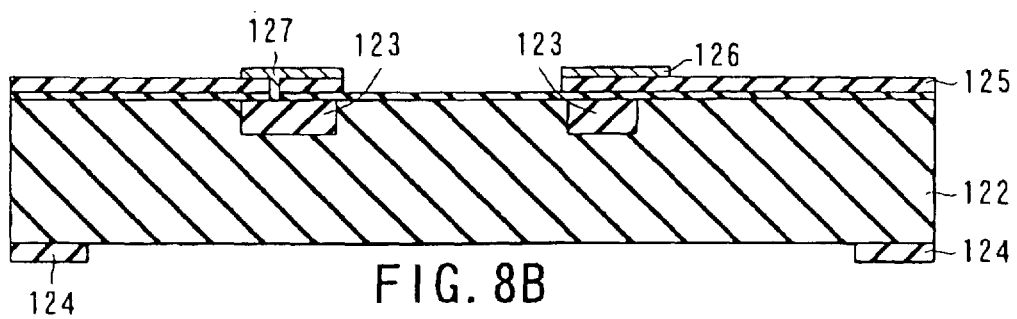
FIG. 9A
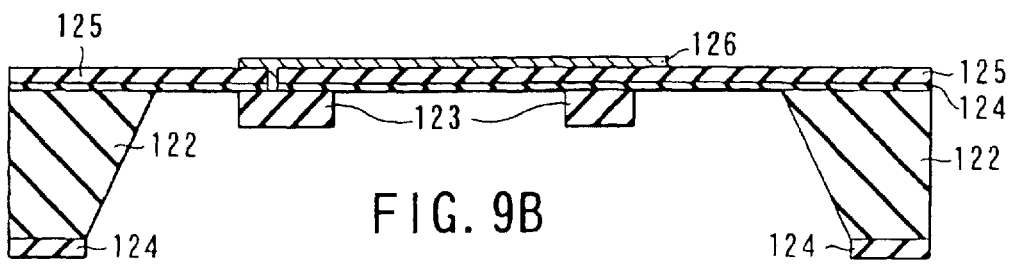
FIG. 9B

VARIABLE GEOMETRY MIRROR HAVING HIGH-PRECISION, HIGH GEOMETRY CONTROLLABILITY

CROSS-REFERENCE TO RELATED APPLICATIONS

This application is based upon and claims the benefit of priority from the prior Japanese Patent Application No. 2001-282296, filed Sep. 17, 2001, the entire contents of which are incorporated herein by reference. This application is a divisional application of U.S. Ser. No. 10/245,665 filed on Sep. 17, 2002 now U.S. Pat. No. 6,682,199, the contents of which are incorporated herein in its entirety by this reference.

BACKGROUND OF THE INVENTION

1. Field of the Invention

The present invention relates to a variable geometry cylinder mirror and more particularly to a highly configurable, high precision cylindrically deformable variable geometry mirror.

2. Description of the Related Art

In the field of high-precision micro optical systems such as an optical pickup, a micro variable focus mirror capable of changing the curvature of its reflecting face has been proposed so as to aim at simplification of the structure for focusing, which conventionally uses an electromagnetic actuator.

Further, in a small image pickup optical system, miniaturization is largely dependant on the size of the variable focus mirror.

Adoption of micro electromechanical system (MEMS) technology in a variable focus mirror enables low-cost, high-precision manufacturing thereof.

An example of the cylindrically deformable variable geometry cylinder mirror of this technology is a monolithic reflecting mirror apparatus disclosed in Jpn. Pat. Appln. KOKAI Publication No. 2-101402.

In this monolithic reflection mirror unit, as shown in FIG. 26, a metallic thin film 54, which serves as an electrode layer, is formed on a silicon semiconductor substrate 51, which acts as a fixed side electrode, through a silicon epitaxial layer 52 and a silicon oxide thin film 53. Window holes 56, 57 are formed in the silicon oxide thin film 53 and the metallic thin film 54 with a central portion 55 left between them.

Because the window holes 56, 57 communicate with each other through a vacant portion 58 formed in the silicon epitaxial layer 52, the central portion 55 is set up as a straddle-mounted type reflection mirror portion.

The straddle-mounted type reflection mirror portion 55 opposes the silicon semiconductor substrate 51 through the vacant portion 58. By applying a potential difference to 51 and 55, the reflection mirror portion 55 is distorted, thereby functioning as a variable geometry cylinder mirror.

However, although the variable geometry cylinder mirror employing the conventional monolithic type reflection mirror unit can be so constructed as a small, low-cost variable geometry cylinder mirror, the electrostatic force applied to the reflection mirror portion cannot be changed according to each position. Thus, this variable geometry cylinder mirror cannot be deformed to an asymmetrical shape.

Further, the variable geometry cylinder mirror using the conventional monolithic type reflection mirror unit can only be changed from a flat face to a concave face and it cannot be deformed to a convex shape.

Additionally, because the center of the reflection mirror portion always drops with deformation of the variable geometry cylinder mirror using the conventional monolithic type reflection mirror unit, there is a problem that the curvature cannot be changed with the center portion fixed.

Further, the straddle mounted type structure is distorted by deformation of the reflection mirror portion. Thus, if a large distortion is desired, a high voltage is needed in order to produce a large electrostatic force.

BRIEF SUMMARY OF THE INVENTION

The present invention has been achieved in view of the above-described problems and therefore, an object of the present invention is to provide a small variable geometry cylinder mirror, the shape of which can be freely set and can also be asymmetrical.

Another object of the present invention is to provide a variable geometry cylinder mirror, which can be deformed continuously from a concave face to a convex face and further which can be deformed with the center or any point of the reflection mirror fixed.

Still another object of the present invention is to provide a variable geometry cylinder mirror capable of obtaining large changes in curvature with a relatively low voltage.

In order achieve the above objects, according to a first aspect of the present invention, there is provided a variable geometry cylinder mirror comprising:

a frame member;

a flexible thin film in which two end portions opposing each other are supported by the frame member;

a reflection surface which is provided on the flexible thin film and reflects light;

a first electrode provided integrally with the flexible thin film;

a second electrode substantially fixed to the frame member so as to oppose the first electrode on an opposite side of the reflection surface; and a third electrode substantially fixed to the frame member so as to oppose the first electrode on the same side as the reflection surface, wherein an optical opening to introduce light into the reflection surface is provided on the side of the reflection surface, at least any one of the second and third electrodes is divided in the direction connecting the two end portions, and the configuration of the reflection surface is controlled to a desired configuration by applying a desired voltage selectively to between the first electrode and the divided second or third electrode.

According to a second aspect of the present invention, there is provided a variable geometry cylinder mirror according to the first aspect, wherein the reflection surface of the flexible thin film is formed of metallic thin film and serves as the first electrode.

According to a second aspect of the present invention, there is provided a variable geometry cylinder mirror according to first aspect, wherein an openings are provided on both sides of the reflection surface in the flexible member across a straight line connecting the end portions supported by the frame member.

According to a fourth aspect of the present invention, there is provided a variable geometry cylinder mirror according to the first aspect, wherein in a region between the end portion supported by the frame member and the reflection surface in the flexible thin film, stiffness thereof in the direction in which the second or third electrode is divided is decreased.

According to a fifth aspect of the present invention, there is provided a variable geometry cylinder mirror according to the fourth, wherein the region in which the stiffness of the flexible thin film is dropped is wave-like.

According to a sixth aspect of the present invention, there is provided a variable geometry cylinder mirror according to the fifth aspect, wherein the flexible thin film is composed of overlaid layers of metallic thin film and silicon nitride or metallic thin film and silicon oxide.

According to a seventh aspect of the present invention, there is provided a variable geometry cylinder mirror according to the fourth aspect, wherein as for the sectional area of the flexible thin film in a direction perpendicular to the direction in which the second or third electrode is divided, that of the region in which the stiffness of the flexible thin film is dropped is smaller than that of a region corresponding to the reflection surface.

According to an eighth aspect of the present invention, there is provided variable geometry cylinder mirror according to the fourth aspect, wherein an opening or a cutout is provided in the region in which the stiffness of the flexible thin film is dropped.

According to a ninth aspect of the present invention, there is provided a variable geometry cylinder mirror according to the first aspect, wherein the flexible thin film is composed of overlaid layers of metallic thin film and polymer material thin film.

According to a tenth aspect of the present invention, there is provided a variable geometry cylinder mirror according to the seventh aspect, wherein the flexible thin film is composed of overlaid layers of metallic thin film and polymer material thin film.

According to an eleventh of the present invention, there is provided a variable geometry cylinder mirror according to the eighth aspect, wherein the flexible thin film is composed of overlaid layers of metallic thin film and polymer material thin film.

According to a twelfth aspect of the present invention, there is provided a variable geometry cylinder mirror according to the first aspect, wherein the third electrode and a supporting member thereof are provided outside the optical opening.

According to a thirteenth aspect of the present invention, there is provided a variable geometry cylinder mirror according to the first aspect, wherein the third electrode is disposed within the optical opening while the third electrode disposed within the optical opening and the supporting member thereof have property allowing light to be transmitted through.

According to a fourteenth aspect of the present invention, there is provided a variable geometry cylinder mirror comprising:

a frame member;

a flexible thin film in which two end portions opposing each other are supported by the frame member;

a reflection surface which is provided on the flexible thin film and reflects light;

a first electrode provided integrally with the flexible thin film; and a second electrode substantially fixed to the frame member so as to oppose the first electrode on an opposite side of the reflection surface, the second electrode being divided in the direction connecting the two end portions, wherein the configuration of the reflection is controlled to a desired configuration by applying a desired voltage selectively to between the first electrode and the divided second or third electrode.

According to a fifteenth aspect of the present invention, there is provided a variable geometry cylinder mirror according to the fourteenth aspect, wherein the reflection surface of the flexible thin film is formed of metallic thin film and serves as the first electrode.

According to a sixteenth aspect of the present invention, there is provided a variable geometry cylinder mirror according to the fourteenth aspect, wherein an openings are provided on both sides of the reflection surface in the flexible member across a straight line connecting the end portions supported by the frame member.

According to a seventeenth aspect of the present invention, there is provided a variable geometry cylinder mirror according to the fourteenth aspect, wherein in a region between the end portion supported by the frame member and the reflection surface in the flexible thin film, stiffness thereof in the direction in which the second electrode is divided is decreased.

According to an eighteenth aspect of the present invention, there is provided a variable geometry cylinder mirror according to the seventeenth aspect, wherein the region in which the stiffness of the flexible thin film is dropped is wave-like.

According to a nineteenth aspect of the present invention, there is provided a variable geometry cylinder mirror according to the eighteenth aspect, wherein the flexible thin film is composed of overlaid layers of metallic thin film and silicon nitride or metallic thin film and silicon oxide.

According to a twentieth aspect of the present invention, there is provided a variable geometry cylinder mirror according to the seventeenth aspect, wherein as for the sectional area of the flexible thin film in a direction perpendicular to the direction in which the second electrode is divided, that of the region in which the stiffness of the flexible thin film is dropped is smaller than that of a region corresponding to the reflection surface.

According to a twenty-first aspect of the present invention, there is provided a variable geometry cylinder mirror according to the seventeenth aspect, wherein an opening or a cutout is provided in the region in which the stiffness of the flexible thin film is dropped.

According to a twenty-second aspect of the present invention, there is provided a variable geometry cylinder mirror according to the fourteenth aspect, wherein the flexible thin film is composed of overlaid layers of metallic thin film and polymer material thin film.

According to a twenty-third aspect of the present invention, there is provided a variable geometry cylinder mirror according to the twentieth aspect, wherein the flexible thin film is composed of overlaid layers of metallic thin film and polymer material thin film.

According to a twenty-fourth aspect of the present invention, there is provided a variable geometry cylinder mirror according to the twenty-first aspect, wherein the flexible thin film is composed of overlaid layers of metallic thin film and polymer material thin film.

According to a twenty-fifth aspect of the present invention, there is provided a variable geometry cylinder mirror according to the first aspect, wherein the flexible thin film having the frame member, the reflection surface and the first electrode is manufactured by:

a diffused layer forming step of forming a diffused layer having a predetermined shape of a conductive type in a first main face of a mono-crystal silicon substrate of another conductive type;

a thin film laminating step of laminating a thin film on the first main face of the mono-crystal silicon substrate;

an etching step of, with a predetermined voltage applied to the diffused layer of the conductive type, carrying out electrochemical etching from a second main face in etching solution; and a cutting and separating step of cutting and separating frame-like mono-crystal silicon which is part of the mono-crystal silicon substrate form portions corresponding to the flexible thin film and the frame member.

According to a twenty-sixth aspect of the present invention, there is provided a variable geometry cylinder mirror according to the fourteenth aspect, wherein the flexible thin film having the frame member, the reflection surface and the first electrode is manufactured by:

a diffused layer forming step of forming a diffused layer having a predetermined shape of a conductive type in a first main face of a mono-crystal silicon substrate of another conductive type;

a thin film laminating step of laminating a thin film on the first main face of the mono-crystal silicon substrate;

an etching step of, with a predetermined voltage applied to the diffused layer of the conductive type, carrying out electrochemical etching from a second main face in etching solution; and cutting and separating step of cutting and separating frame-like mono-crystal silicon which is part of the mono-crystal silicon substrate form portions corresponding to the flexible thin film and the frame member.

According to a twenty-seventh aspect of the present invention, there is provided a variable geometry cylinder mirror according to the fifth aspect, wherein the flexible thin film having the frame member, the reflection surface and the first electrode is manufactured by:

a groove forming step of forming parallel grooves in a first main face of a flat substrate;

a thin film forming step of forming a thin film on the first main face of the substrate;

an etching step of etching until the thin film formed in the thin film forming step is exposed from a second main face of the substrate; and a cutting and separating step of cutting and separating a fame-like portion which is part of the substrate from portions corresponding to the flexible thin film and the frame member.

According to a twenty-eighth aspect of the present invention, there is provided a variable geometry cylinder mirror according to the eighteenth aspect, wherein the flexible thin film having the frame member, the reflection surface and the first electrode is manufactured by:

a groove forming step of forming parallel grooves in a first main face of a flat substrate;

a thin film forming step of forming a thin film on the first main face of the substrate;

an etching step of etching until the thin film formed in the thin film forming step is exposed from a second main face of the substrate; and a cutting and separating step of cutting and separating a fame-like portion which is part of the substrate from portions corresponding to the flexible thin film and the frame member.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiment of the invention, and together with the general description given above and the detailed description of the preferred embodiment given below, serve to explain the principles of the invention.

FIG. 7 is a top view of the intermediate substrate 102 for explaining the method of manufacturing the intermediate substrate of the variable geometry cylinder mirror according to the first embodiment of the present invention;

FIGS. 8A and 8B are a sectional view taken along the line 8A—8A and a sectional view taken along the line 8B—8B in FIG. 7;

FIGS. 9A and 9B are a sectional view taken along the line 9A—9A and a sectional view taken along the line 9B—9B in FIG. 7;

DETAILED DESCRIPTION OF THE INVENTION

Figure 1A:
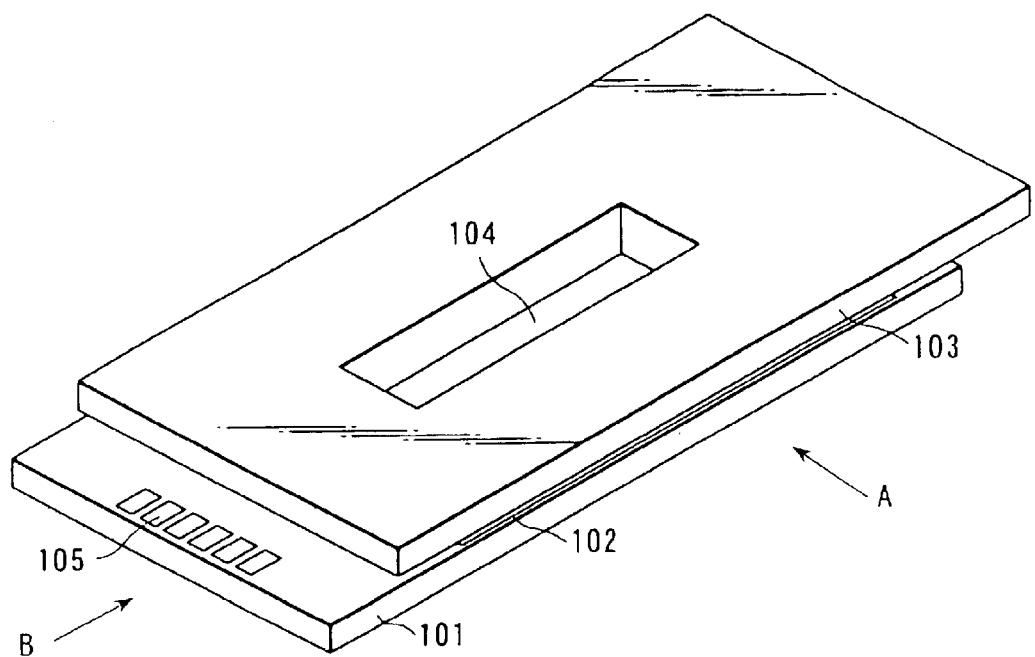
FIGS. 1A and 1B are perspective views of an upper face and a lower face showing the entire structure of a variable geometry cylinder mirror according to a first embodiment of the present invention.

Reference will now be made in detail to the preferred embodiments of the invention as illustrated in the accompanying drawings, in which like reference numerals designate like or corresponding parts.

Hereinafter, the preferred embodiments of the present invention will be described with reference to the accompanying drawings.

(First Embodiment)

A variable geometry cylinder mirror according to a first embodiment of the present invention will be described with reference to FIGS. 1A, 1B to 10A, 10B.

Figure 1B:
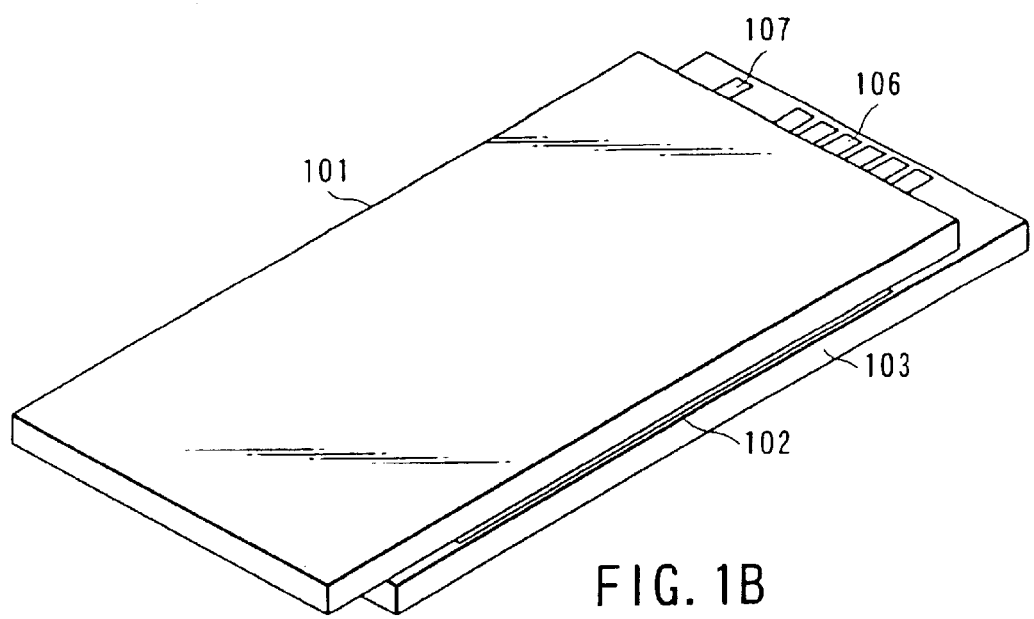

FIGS. 1A and 1B are perspective views of an upper face and a lower face showing the entire structure of the variable geometry cylinder mirror according to the first embodiment of the present invention.

The variable geometry cylinder mirror is constituted of three layers: a bottom substrate 101, an intermediate substrate 102 and an top substrate 103, disposed with a constant space specified by each spacer.

The top substrate 103 has a slit-like opening portion 104 formed therein, for introducing light.

As evident from the same Figure, the bottom substrate 101 and the top substrate 103 are projected with respect to the intermediate substrate 102 in opposite directions.

A lower electrode pad 105 is formed on a projected portion of the bottom substrate 101.

An upper electrode pad 106 and an intermediate electrode pad 107 are formed on a projected portion of the top substrate 103.

Figure 2A:
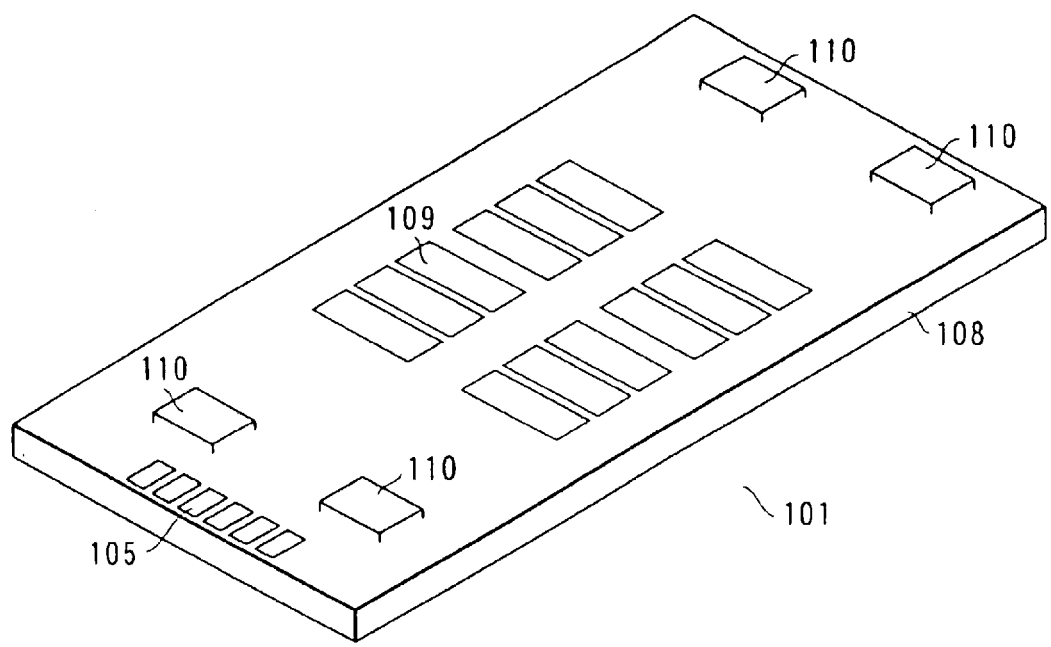
FIGS. 2A and 2B are perspective views of an upper face and a lower face showing a bottom substrate 101 of the variable geometry cylinder mirror according to the first embodiment of the present invention.
Figure 2B:
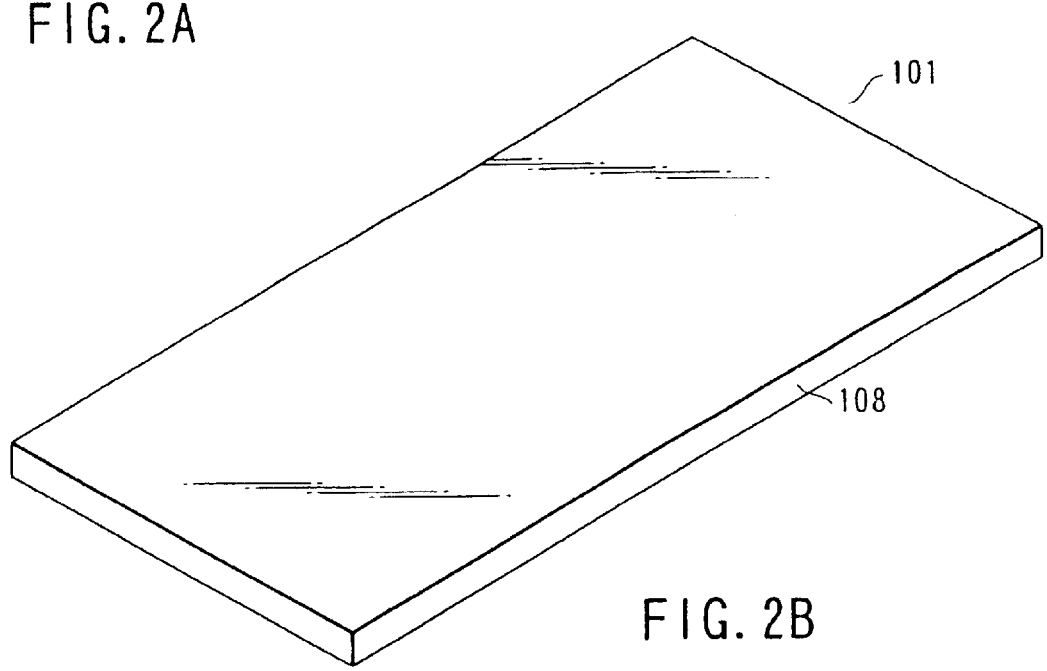

FIGS. 2A and 2B are perspective views of an upper face and a lower face showing the bottom substrate 101.

The bottom substrate 101 is made of mono-crystal silicon substrate 108 having a thickness of 300 $\mu$m, and has a plurality of lower electrodes 109 disposed symmetrically across a region opposing the slit-like opening portion 104 formed in the top substrate 103. The lower electrode pads 105 and connection spacers 110 have a height of 30 $\mu$m relative to the top substrate 103.

The silicon substrate 108 has a wiring layer which connects the respective lower electrodes 109 and lower electrode pads 105 through an interlayer insulating film and contact holes (not shown).

Such multi-layer electrodes and wiring can be formed easily on the silicon substrate 108 using ordinary integrated circuit manufacturing technology.

Figure 3A:
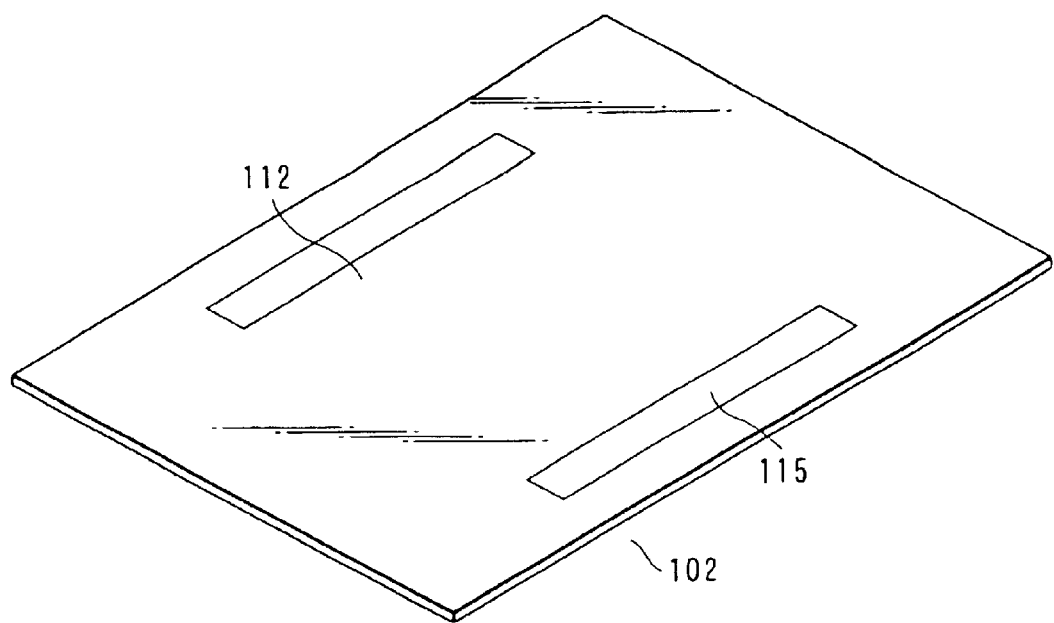
FIGS. 3A and 3B are perspective views of an upper face and a lower face showing an intermediate substrate 102 of the variable geometry cylinder mirror according to the first embodiment of the present invention.
Figure 3B:
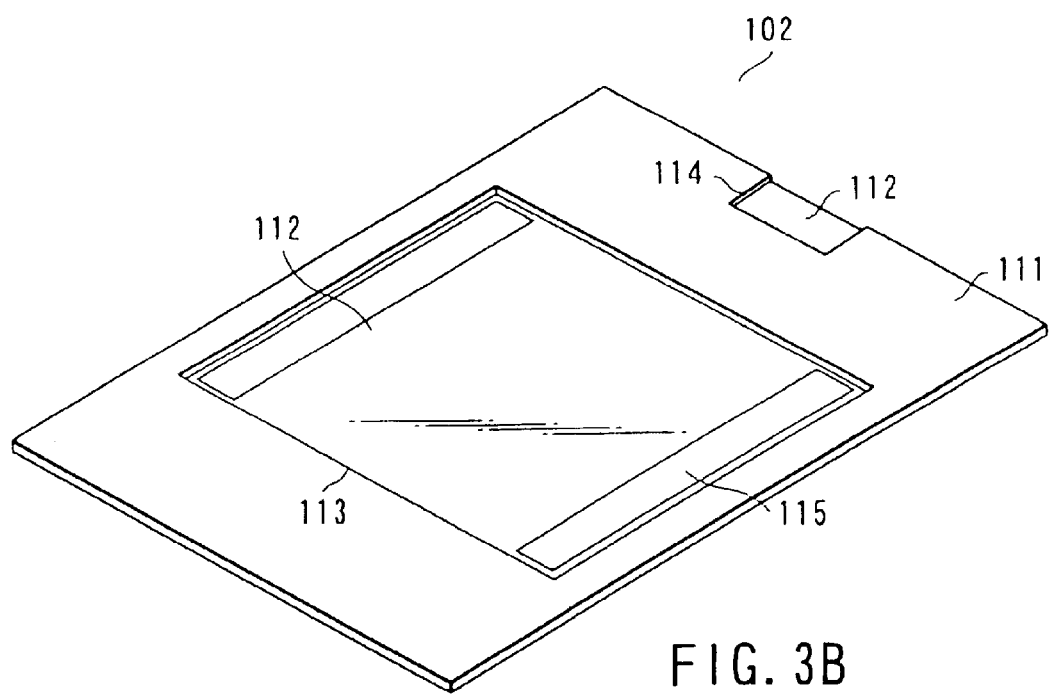

FIGS. 3A and 3B are perspective views of upper face and lower face showing the intermediate substrate 102.

This intermediate substrate 102 has a flexible thin film 112 formed on a mono-crystal silicon substrate 111 having the thickness of 20 $\mu$m, the flexible thin film 112 being comprised of polyamide film 1 $\mu$m thick and Au/Cr overlaid film 50 $\mu$m thick.

The flexible thin film 112 is exposed to an opposite side of the mono-crystal substrate 111 as Au, acting as reflection faces.

A rectangular opening portion 113 and a cutout portion 114 are formed in the mono-crystal silicon substrate 111, through which the flexible thin film 112 is exposed, the mono-crystal silicon substrate 111 being deformable with a slight stress.

Cutouts 115 are formed in the flexible thin film 112 along two side ends parallel to the slit-like opening portion 104 in the top substrate 103, in the opening portion 113. The flexible thin film 112 is like a belt supported by two sides perpendicular to the slit-like opening portion 104 in the top substrate 103.

Figure 4A:
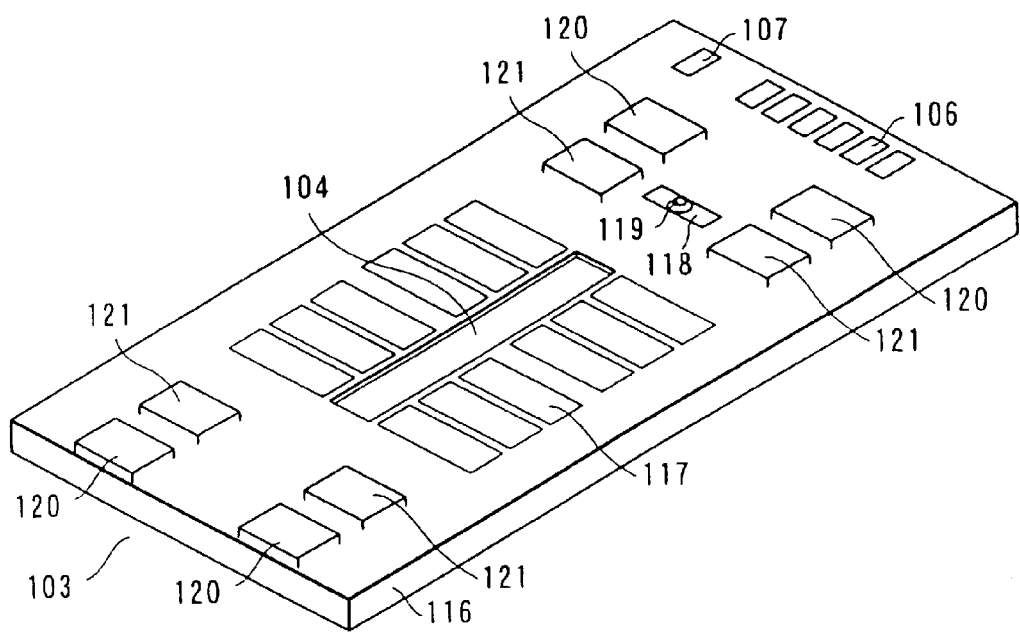
FIGS. 4A and 4B are perspective views of an upper face and a lower face showing a top substrate 103 of the variable geometry cylinder mirror according to the first embodiment of the present invention.
Figure 4B:
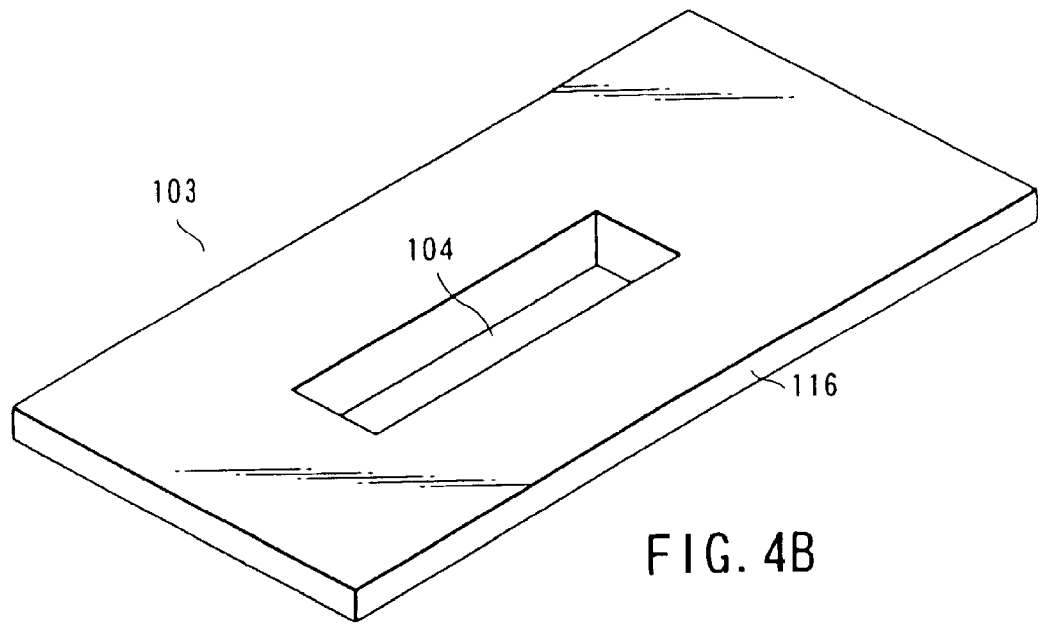

FIGS. 4A and 4B are perspective views of an upper face and a lower face showing the top substrate 103.

This top substrate 103 is made of a mono-crystal silicon substrate 116 having a thickness of 300 $\mu$m, a plurality of upper electrodes 117 disposed in the form of a belt symmetrically with respect to the slit-like opening portion 104, the upper electrode pad 106, the intermediate electrode pad 107, an intermediate electrode lead-out electrode 118, a connecting spacer 120 having a height of 30 $\mu$m to the bottom substrate 101 and a connecting spacer 121 having a height of 30 $\mu$m to the intermediate substrate 102.

The silicon substrate 116 contains wiring layer (not shown) which connects the respective upper electrodes 117, intermediate electrode lead-out electrode 118, upper electrode pad 106 and intermediate electrode pad 107 through an interlayer insulating film and contact holes (not shown).

Such multi-layer electrodes and wiring can be formed easily on the silicon substrate 116 using ordinary integrated circuit manufacturing technology.

The slit-like opening portion 104 can be formed easily by using technology applied to ordinary MEMS device such as anisotropic etching for silicon using strong alkali solution.

Next, connection of the bottom substrate 101, intermediate substrate 102 and top substrate 103 will be described with reference to FIGS. 5A and 5B.

Figure 5A:
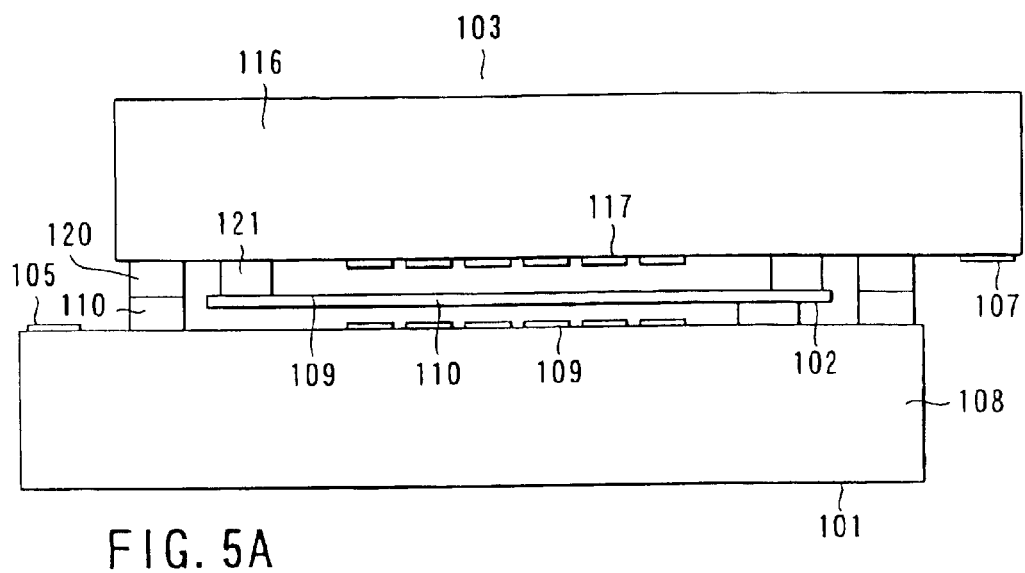
FIGS. 5A and 5B are enlarged views taken in the direction of an arrow A and an arrow B shown in FIG. 1A.
Figure 5B:
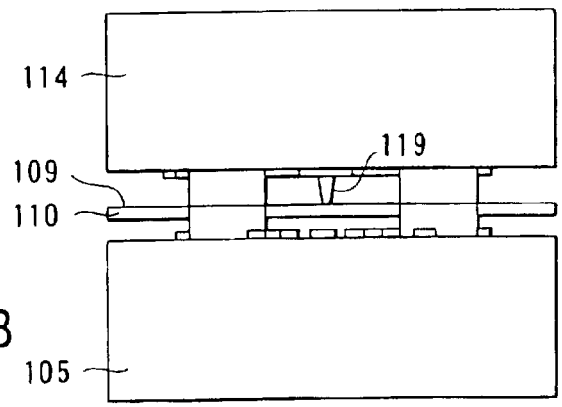

FIGS. 5A and 5B are enlarged views taken in the direction of arrows A and B in FIG. 1A.

That is, in these diagrams, its vertical directions are enlarged to facilitate understanding.

The connecting spacer 110 of the bottom substrate 101 is connected with the connecting spacer 120 of the top substrate 103.

Because the height of each of the connecting spacer 110 and connecting spacer 120 is 30 µm, the bottom substrate 101 and the top substrate 103 oppose each other with a gap of 60 µm.

The intermediate substrate 102 is connected with the top substrate 103 through the connecting spacer 121.

The height of the connecting spacer 121 is 30 µm like the connecting spacer 110 and connecting spacer 120.

Consequently, the flexible thin film 112 on the intermediate substrate 102 is located substantially in the middle of the gap between the bottom substrate 101 and the top substrate 103.

Various kinds of materials can be considered as raw material for the respective connecting spacers 110, 120, 121. If easiness of manufacturing is taken into account, particularly, material which can be fused with heat and patterned by photolithography method is preferred.

An Au bump 119 having the height of 40 µm formed on the intermediate electrode lead-out electrode 118 on the top substrate 103 opposes substantially the center of the rectangular opening portion 113 and cutout 114 formed in the mono-crystal silicon substrate 111 of the intermediate substrate 102. Because the height of this Au bump 119 is slight larger than that of the connecting spacer 121 of the intermediate substrate 102, the flexible thin film 112 is pushed up by this portion. As a result, the Au bump 119 is electrically connected to the intermediate electrode pad 107 through the intermediate electrode lead-out electrode 118 on the top substrate 103 because metallic film is exposed on the surface of the flexible thin film 112.

At this time, the flexible thin film 112 is deformed in the region of the cutout 114. However, the deformation of the flexible thin film 112 in the region of the cutout 114 never affects the flexible thin film 112 in the region of the opening portion 113 because the flexible thin film 112 is separated by the silicon thin plate 111 having a sufficiently higher stiffness than the flexible thin film 112.

Because the lower electrode pad 105 and the upper electrode pad 106 correspond to the lower electrode 109 and the upper electrode 106, respectively while the flexible thin film 112 is connected to the intermediate electrode pad 107, if an external lead wire is connected to the electrode pads 105, 106, 107 so as to connect them to independent power supplies, independent voltage can be applied to each of the flexible thin film 112, the lower electrode 109 and the upper electrode 117.

Next, the operation of the variable geometry cylinder mirror of this embodiment will be described with reference to FIG. 6.

Figure 6:
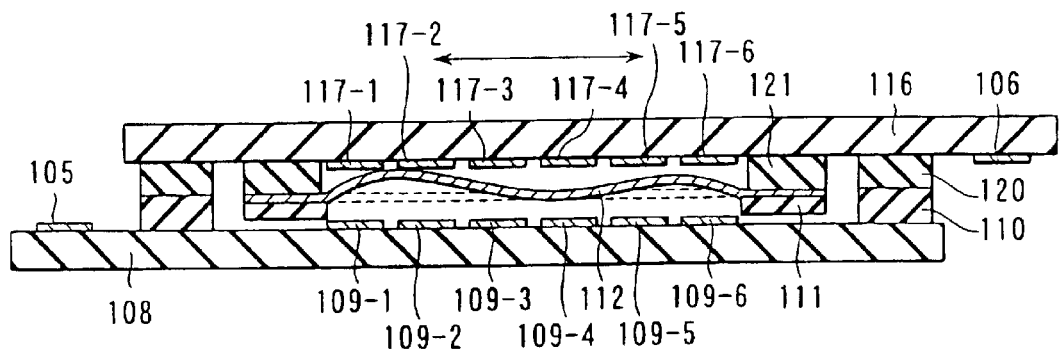
FIG. 6 is a sectional view parallel to a slit-like opening portion 104 in a region in which a lower electrode 109 and an upper electrode 117 oppose each other for explaining the operation of the variable geometry cylinder mirror according to the first embodiment of the present invention.

FIG. 6 shows a sectional view parallel to the slit-like opening portion 104 in the region in which the lower electrode 109 and the upper electrode 117 oppose each other.

If the flexible thin film 112, all the lower electrodes 109 and all the upper electrodes 117 are grounded, the flexible thin film 112 turns into a flat shape as indicated with dotted line in the same Figure. If a high voltage is applied to the upper electrodes 117-1, 117-2, 117-5, 117-6 and the lower electrodes 109-3, 109-4 while the flexible thin film 112, the upper electrodes 117-3, 117-4 and the lower electrodes 109-1, 109-2, 109-5, 109-6 are grounded, the flexible thin film turns to an indicated wave-like shape.

If the voltage applied to the upper electrodes 117-1, 117-2 is slightly higher than that applied to the upper electrodes 117-5, 117-6, an asymmetrical deformation shape with respect to the center can be obtained as indicated in the same Figure.

By adjusting the voltage applied to the lower electrodes 109 and the upper electrode 117, the flexible thin film 112 can be deformed into any shape.

According to this embodiment, although no electrode for activating electrostatic force is formed just below the region of the top substrate in which the slit-like opening portion 104 is formed, its influence can be reduced to a level which can be neglected by increasing the width of the top electrode 117 and the bottom electrode 109 so as to be much larger than the width of this region.

Additionally, according to this embodiment, power consumption can be kept very low by using an electrostatic force for driving and because the structure is simple, it can be miniaturized.

Further, this embodiment enables deformation to both a concave shape and a convex shape and driving force can be controlled independently for each region opposing the electrode. Therefore, for example, the flexible thin film can be changed from the concave face to the convex face without deflecting the center of the mirror or any one point vertically by controlling the distribution of the driving force appropriately.

This feature cannot be acquired from an air pressure type variable geometry mirror.

Further, because light enters directly into the flexible thin film 112 which acts as a reflection surface through the slit-like opening portion 104, no glass face or the like exists between incident light and the reflection surface. Thus, there is no loss of light beam, change in beam path length or deterioration of focusing performance.

Although according to this embodiment, the upper electrode 117 and the lower electrode 109 are divided substantially into six equal sections, needless to say, the number of electrodes may be changed or the electrodes may be divided unequally depending on a desired configuration or accuracy.

Next, the method of manufacturing the intermediate substrate of the variable geometry cylinder mirror of this embodiment will be described with reference to FIGS. 7 to 10B.

FIG. 7 shows a top view of the intermediate substrate 102. Sections 8A—8A, 9A—9A and 10A—10A in FIG. 7 will be described with reference to FIGS. 8A, 9A and 10A.

Further, the sections 8B—8B, 9B—9B and 10B—10B in FIG. 7 will be described with reference to FIGS. 8B, 9B and 10B.

As shown in FIGS. 8A and 8B, an N-type impurity diffused layer 123 is formed in a P-type low density semiconductor substrate (mono-crystal semiconductor substrate) 122.

A silicon nitride film 124 is formed on both faces of the P-type low density semiconductor substrate (mono-crystal semiconductor substrate) 122.

An opening pattern larger than the intermediate substrate 102 is formed on the rear side of the silicon nitride film 124.

If viewed from above, the region in which the N type impurity diffused layer 123 is formed is substantially equal to the region of the intermediate substrate 102 in which the mono-crystal silicon substrate 111 is formed.

Further, it is preferable if the silicon nitride film 124 imparts a small stress on the silicon substrate 122, by appropriately controlling the composition of that film.

Next, a polyimide film 125 having a thickness of 1 μm and a metallic film 126 having a thickness of 0.1 μm are formed successively on the silicon nitride film 124.

Then, the metallic film 126 is patterned.

The metallic film 126 and the polyimide film 125 are removed by patterning in the region of the cutout 115 shown in FIG. 7.

Preferably, a very thin chrome thin film is formed between the polyimide film 125 and the metallic thin film 126, thus adhesion of the metallic film 126 is improved.

Prior to formation of the metallic film 126, a contact hole 127 is formed in the polyimide film 125 and the silicon nitride film 124 on the front surface, so that the metallic film 126 is electrically conductive with the N-type impurity diffused layer 123.

Next, as shown in FIGS. 9A and 9B, with the front surface protected by mechanical sealing or the like, electrochemical etching is carried out with a strong alkali solution by applying a positive voltage to the metallic thin film 126.

Because the metallic film 126 is conductive with the N-type impurity diffused layer 123, etching is progressed in the region in which the silicon nitride film 124 on the front surface is removed by patterning until the silicon nitride film 124 on the front surface is exposed with the region of the N-type impurity diffused layer 123 left.

Figure 10A:
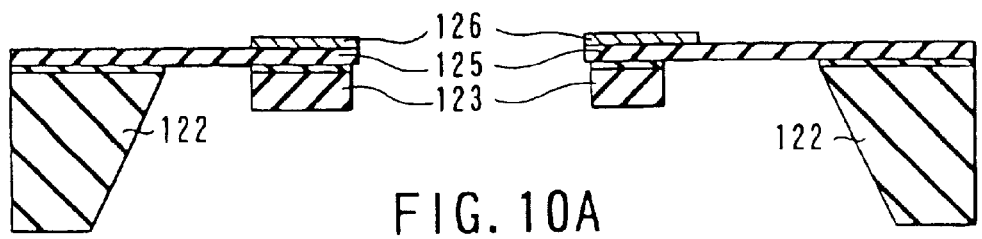
FIGS. 10A and 10B are a sectional view taken along the line 10A—10A and a sectional view taken along the line 10B—10B in FIG. 7.
Figure 10B:
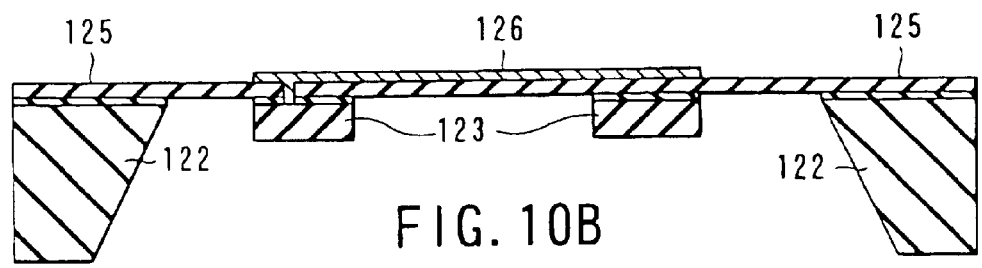

Next, as shown in FIGS. 10A and 10B, the silicon nitride film on the exposed suction face on the rear side and front side is removed by reactive ion etching from the rear side.

By cutting out the polyimide film 125 along the outer shape of the left N-type impurity diffused layer 123 according to excimer laser aberration or the like, the intermediate substrate 102 is obtained.

Although this embodiment indicates one manufacturing method of the intermediate substrate, it is needless to say that actually, a plurality of the intermediate substrates are obtained from one silicon wafer.

According to this method of manufacturing the intermediate substrate, as it can be formed in a completely monolithic way according to ordinary semiconductor manufacturing technology and MEMS technology, excellent productivity and safety are ensured.

Particularly, the manufacturing method of this embodiment in which the flexible thin film is formed on a thick solid substrate while the substrate is turned into thin film by electrochemical etching is preferable for an application requiring a high accuracy reflection surface in that there is no distortion accompanying a machining process for a frame member.

(Second Embodiment)

A second embodiment of the present invention will be described with reference to FIGS. 11A to 19.

This embodiment is different from the first embodiment only in the intermediate substrate.

Figure 11A:
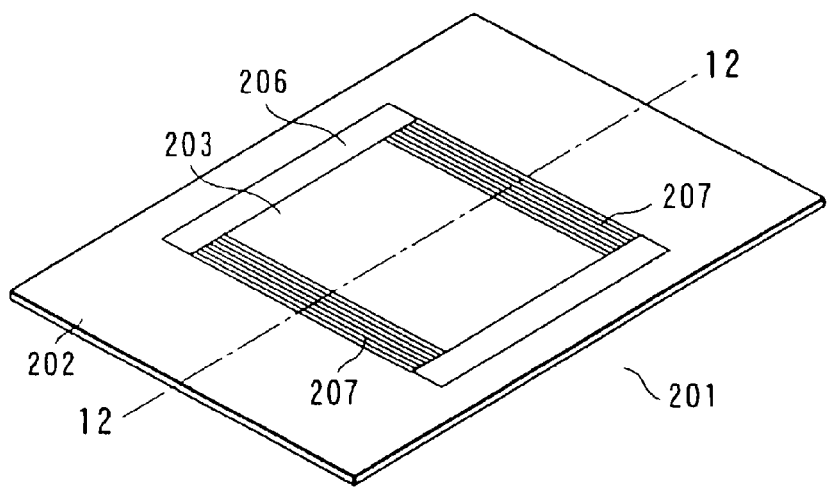
FIGS. 11A and 11B are perspective views of an upper face and a lower face showing an intermediate substrate 201 of a variable geometry cylinder mirror according to a second embodiment of the present invention.
Figure 11B:
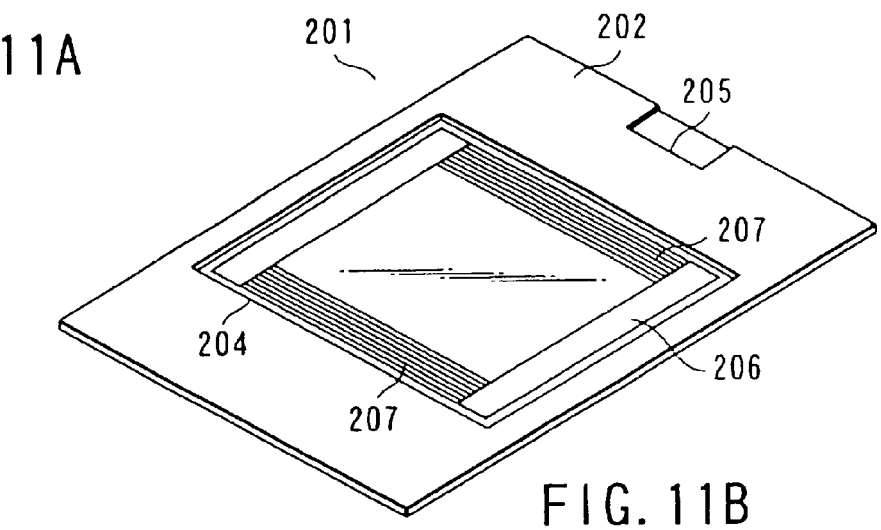

FIGS. 11A and 11B are perspective views of an upper face and a lower face showing the structure of an intermediate substrate 201 of a variable geometry cylinder mirror according to the second embodiment of the present invention.

Basically, the intermediate substrate 201 of this embodiment has the same configuration as the intermediate substrate 102 of the first embodiment shown in FIGS. 3A and 3B. A flexible thin film 203 comprising silicon nitride film 400 nm thick and metallic thin film 50 nm thick is formed on the top face of a thin mono-crystal silicon substrate 202 having the thickness of 20 μm which serves as a frame member.

Here it is assumed that the metallic thin film is exposed to the top face.

In the same manner as in the first embodiment, a rectangular opening portion 204 and a cutout 205 are formed in the mono-crystal silicon substrate 202 and a belt-like flexible thin film 203 is exposed in this portion and deformable with a slight stress.

Like the first embodiment, in the opening portion 204, cutouts 206 are formed in the flexible thin film 203 on its ends along two sides parallel to the slit-like opening 104 in the top substrate 103 and the flexible thin film 203 is shaped in the form of a belt supported by two sides perpendicular to the slit-like opening 104 in the top substrate 103.

A wave-like portion 207 of the flexible thin film 203 is formed near the two sides supporting the flexible thin film 203.

Figure 12:
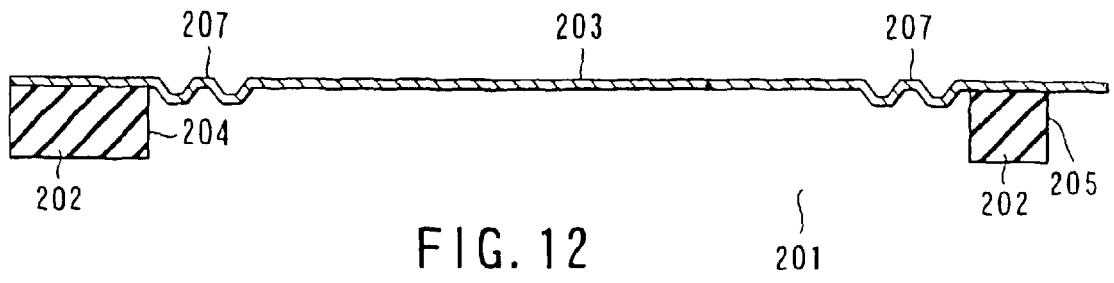
FIG. 12 is a sectional view taken along the line 12—12 in FIG. 11A.

Next, FIG. 12 shows a section taken along the line 12—12 in FIG. 11A.

The flexible thin film 203 constructs the wave-like portion 207 in the vicinity of its sides supported by the thin mono-crystal silicon substrate 202 which acts as a frame member.

The variable geometry cylinder mirror of this embodiment is driven in the same manner as the variable geometry cylinder mirror of the first embodiment shown in FIG. 6. Because both the ends of the flexible thin film 203 are constructed in the form of a wave, it is expanded or contracted easily through this portion. Thus, if material having a large longitudinal elastic modulus like silicon nitride film is utilized as the flexible thin film 203 in the variable geometry cylinder mirror of the first embodiment, a relatively large deflection can be secured even when a high voltage is not applied to the same upper electrode 117 or lower electrode 109 as in the variable geometry cylinder mirror of the first embodiment.

That is, the mechanical properties of the silicon nitride film only slightly change over time, and its stiffness remains substantially high. This embodiment is preferable for long term use in high temperature and humidity environments.

Preferably, the wave-like portion 207 is located near the end portion, away from direct light.

Although in this embodiment, the wave-like portion 207 is provided on both end portions, it is needless to say that it could be provided on one side only.

Next, a method of manufacturing the intermediate substrate 201 of the variable geometry cylinder mirror according to the second embodiment of the present invention will be described with reference to FIGS. 13 to 16.

Figure 13:
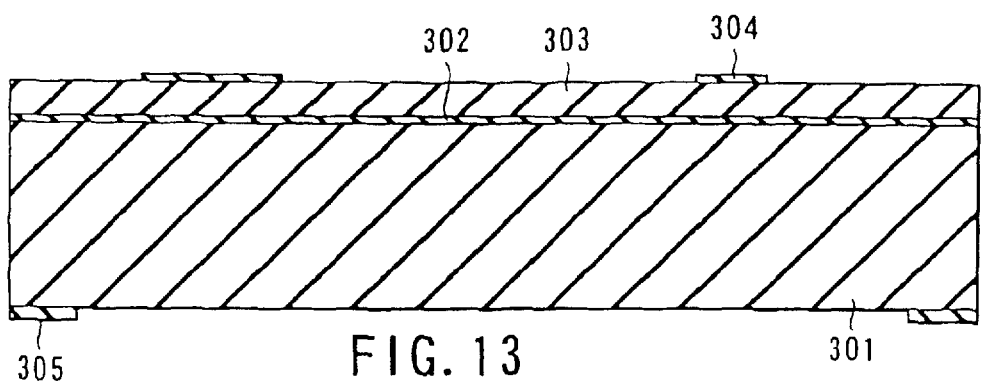
FIG. 13 is a sectional view for explaining a method of manufacturing an intermediate substrate 201 of the variable geometry cylinder mirror according to the second embodiment of the present invention.

A silicon nitride film is formed on both faces of an overlay type SOI substrate in which as shown in FIG. 13, a mono-crystal silicon active layer 303 having a thickness of 20 μm is bonded to a mono-crystal silicon substrate 301 having a face bearing of <100>, 500 μm thick through a silicon oxide film 302.

Then, upper and rear face silicon nitride films 304 and 305 are formed by patterning.

Figure 14:
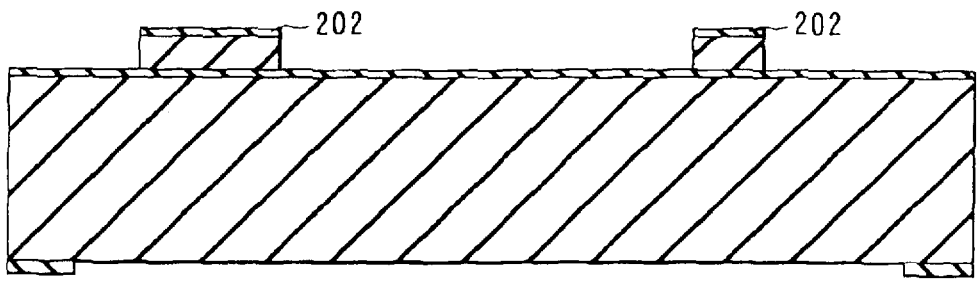
FIG. 14 is a sectional view for explaining the method of manufacturing the intermediate substrate 201 of the variable geometry cylinder mirror according to the second embodiment of the present invention.

Next, as shown in FIG. 14, the mono-crystal silicon active layer 303 is patterned by reactive ion etching with the upper face silicon nitride pattern 304 as a mask. Consequently, a thin silicon region corresponding to the frame member 202 is formed as shown in FIG. 12.

Figure 15:
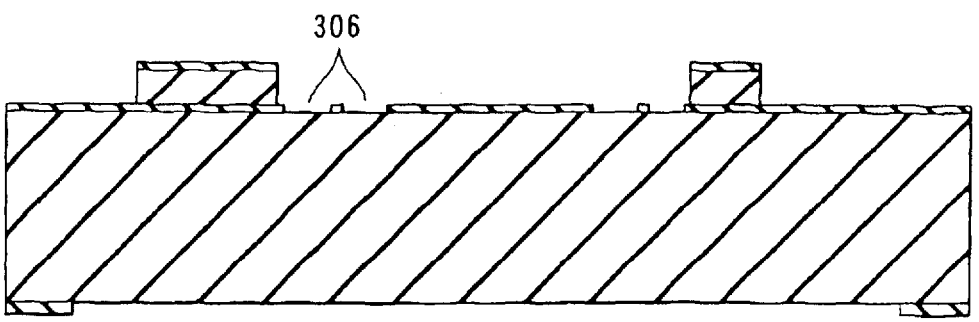
FIG. 15 is a sectional view for explaining the method of manufacturing the intermediate substrate 201 of the variable geometry cylinder mirror according to the second embodiment of the present invention.

Next, as shown in FIG. 15, an opening portion 306 is formed in the exposed silicon oxide film 302 with ordinary photolithography technology.

Figure 16:
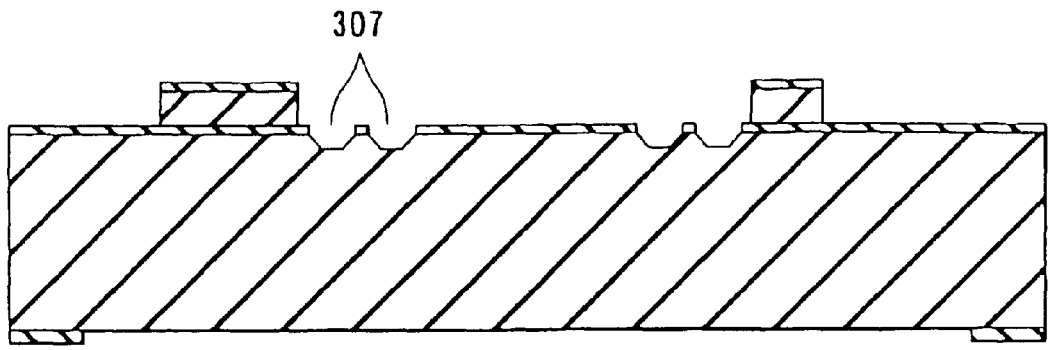
FIG. 16 is a sectional view for explaining the method of manufacturing the intermediate substrate 201 of the variable geometry cylinder mirror according to the second embodiment of the present invention.

Next, as shown in FIG. 16, anisotropic etching is carried out in the opening portion 306 up to 2 μm with tetramethyl ammonium hydroxide (YMAH) with the rear face protected and the silicon oxide film 302 as a mask, so that a depression 307 is formed.

Figure 17:
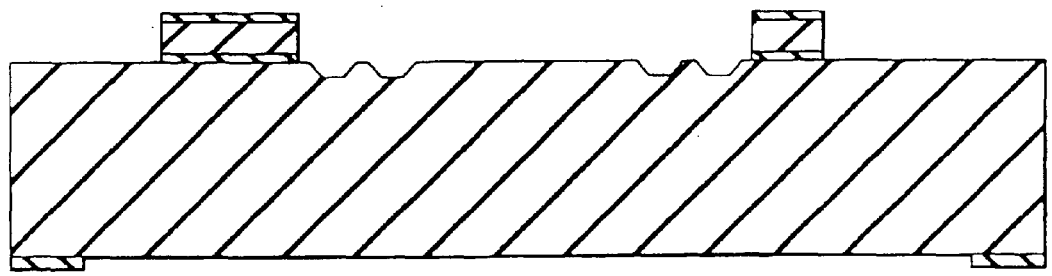
FIG. 17 is a sectional view for explaining the method of manufacturing the intermediate substrate 201 of the variable geometry cylinder mirror according to the second embodiment of the present invention.

Next, as shown in FIG. 17, the exposed silicon oxide film 302 is removed by hydrogen fluoride acid.

Figure 18:
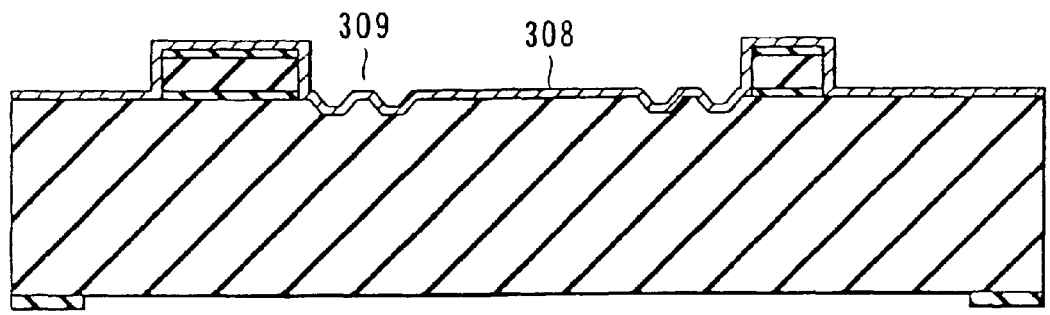
FIG. 18 is a sectional view for explaining the method of manufacturing the intermediate substrate 201 of the variable geometry cylinder mirror according to the second embodiment of the present invention.

Next, as shown in FIG. 18, a silicon nitride film 308 is formed on the top face according to the chemical vapor deposition (CVD) method.

At this time, at a portion in which the dent portion 307 is formed, the silicon nitride film 308 is turned to a wave-like portion 309.

Figure 19:
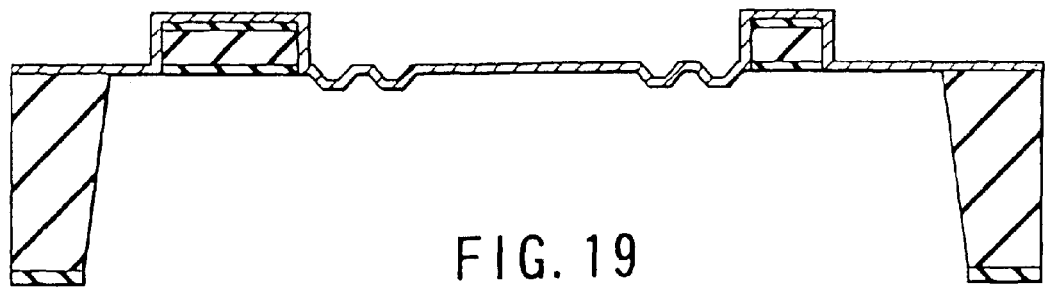
FIG. 19 is a sectional view for explaining the method of manufacturing the intermediate substrate 201 of the variable geometry cylinder mirror according to the second embodiment of the present invention.

Next, as shown in FIG. 19, with the front face protected and the silicon nitride film pattern 305 as a mask, the silicon substrate 301 is etched until the silicon nitride film 308 is exposed.

After that, the thin mono-crystal silicon substrate 202 is cut out along its outer periphery as a frame member shown in FIG. 12 and the intermediate substrate 201 is formed by depositing Au/Cr thin film on an opposite side to the thin mono-crystal silicon substrate 202 of the silicon nitride film 308.

According to the method of manufacturing the intermediate substrate of this embodiment, the stabilized fine wave-like structure can be achieved by using the ordinary MEMS technology, because steps of forming a groove in the mono-crystal silicon substrate 301 according to the photolithography technology, forming the silicon nitride film equally along this configuration and then removing the substrate after that, are adopted.

Although the active layer of the SOI substrate is used as the frame member of the intermediate substrate, a thin mono-crystal silicon forming step may be adopted by using electrochemical etching, in the same manner as in the first embodiment.

According to the method of manufacturing the intermediate substrate of this embodiment, the substrate cost is higher than the method of using electrochemical etching, and the flatness achieved on the substrate is slightly worse. However, because the step of forming the diffused layer can be omitted, the device can be produced in less time.

(Third Embodiment)

A third embodiment will be described with reference to FIGS. 20A and 20B. This embodiment is different from the first embodiment only in the structure of the intermediate substrate.

Figure 20A:
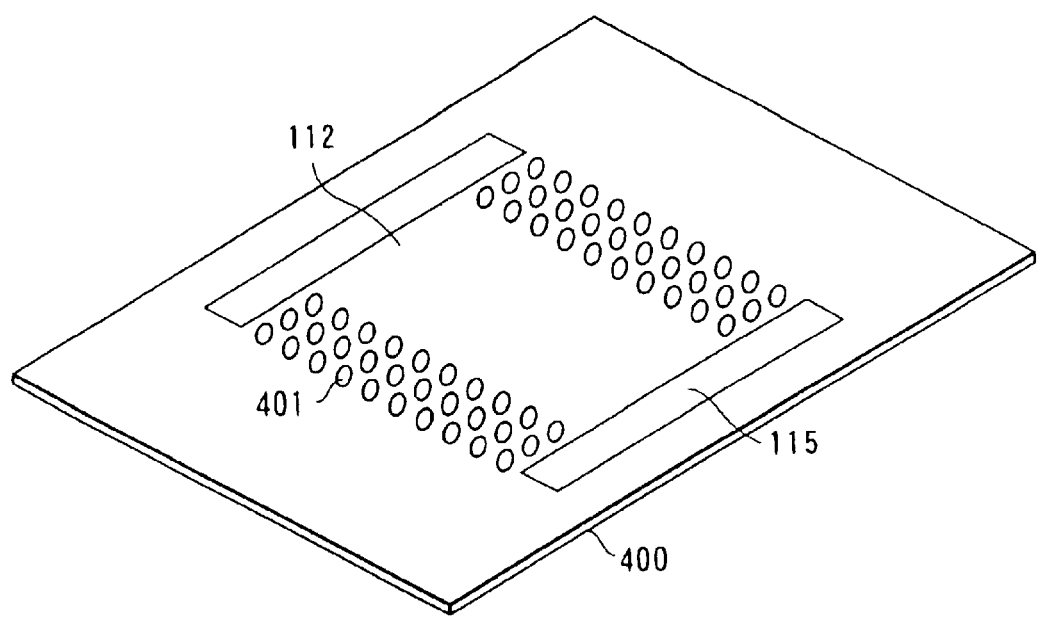
FIGS. 20A and 20B are perspective views of an upper face and a lower face showing an intermediate substrate 400 of a variable geometry cylinder mirror according to a third embodiment of the present invention.
Figure 20B:
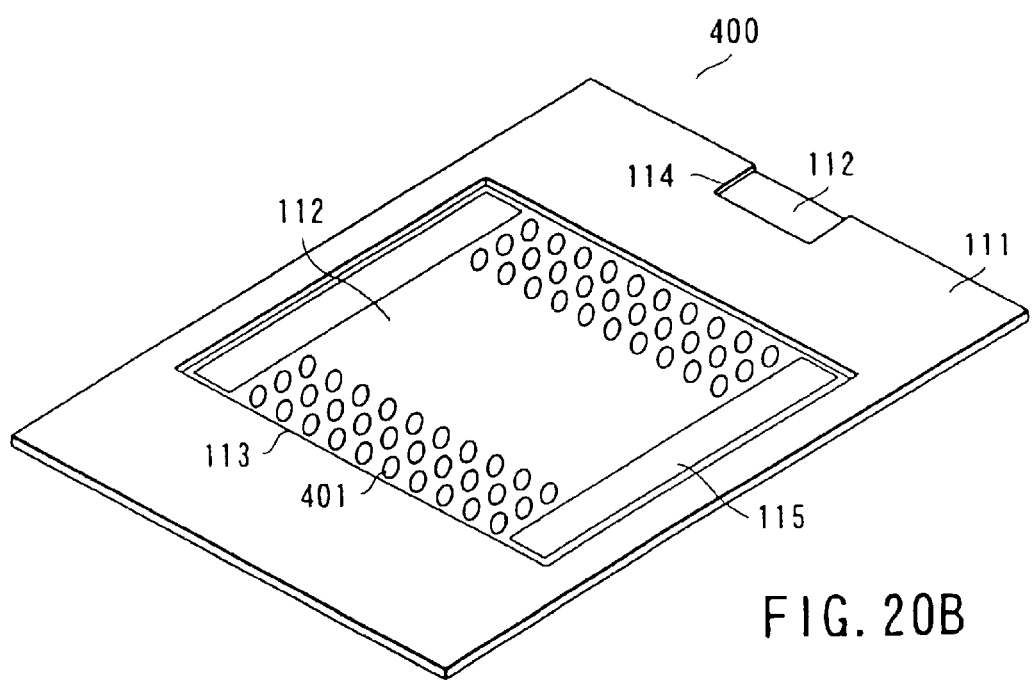

FIGS. 20A and 20B are perspective views of an upper face and a lower face showing an intermediate substrate 400 of a variable geometry cylinder mirror according to the third embodiment of the present invention.

Although basically this intermediate substrate 400 has the flexible thin film 112 composed of mainly polyimide film like the first embodiment, a plurality of circular opening portions 401 are formed in the vicinity of sides supported by the thin mono-crystal silicon 111.

This circular opening portion 401 may be formed by using a photolithography method at the same time when the cutout 115 is formed.

This method does not increase the quantity of steps, as compared to the first embodiment.

According to this embodiment, stiffness in the vicinity of the side supported side of the flexible thin film 112 is reduced by the circular opening portion 401, so that expansion/contraction are enabled by a smaller electrostatic attracting force. As a result, the driving voltage can be reduced as compared to the first embodiment.

According to this embodiment, the plurality of circular opening portions 401 are provided to achieve low stiffness in part of the flexible thin film 112. Needless to say, the shape of this opening portion 401 may be formed in various ways such as rectangular shape, slit, etc.

The same effect can be obtained by providing a U-like cutout or partially thinning, as well as by using a complete opening shape.

That is, by setting smaller the sectional area used for achieving low stiffness in the flexible thin film than the other portions, the stiffness may be adjusted just at a desired portion.

(Fourth Embodiment)

A fourth embodiment will be described with reference to FIGS. 21A and 21B.

This embodiment is different from the first embodiment only in the structure of the top substrate.

Figure 21A:
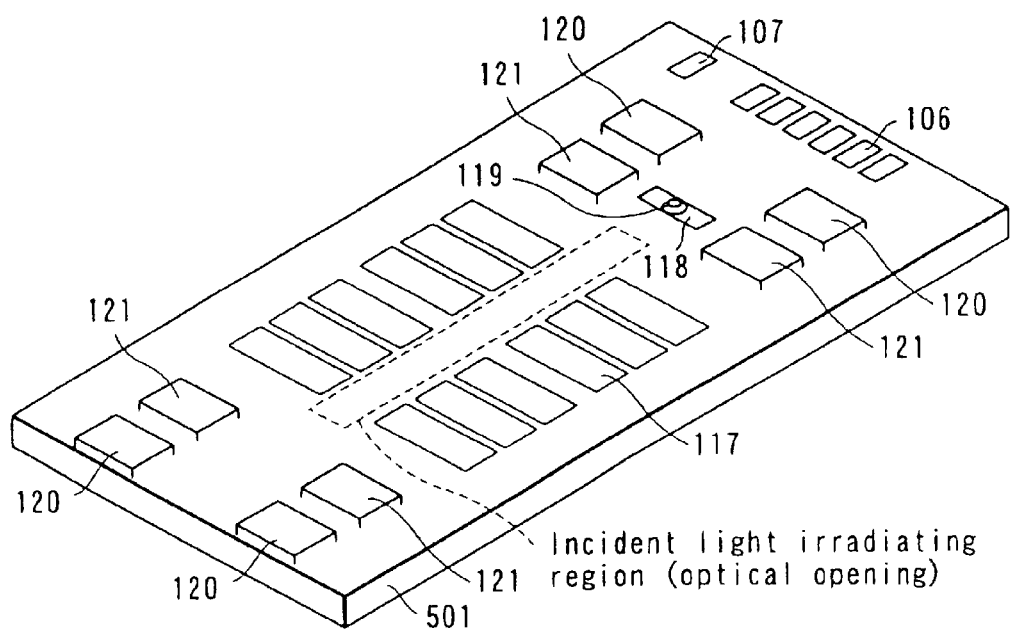
FIGS. 21A and 21B are perspective views of an upper face and a lower face showing a top substrate 501 of a variable geometry cylinder mirror according to a fourth embodiment of the present invention.
Figure 21B:
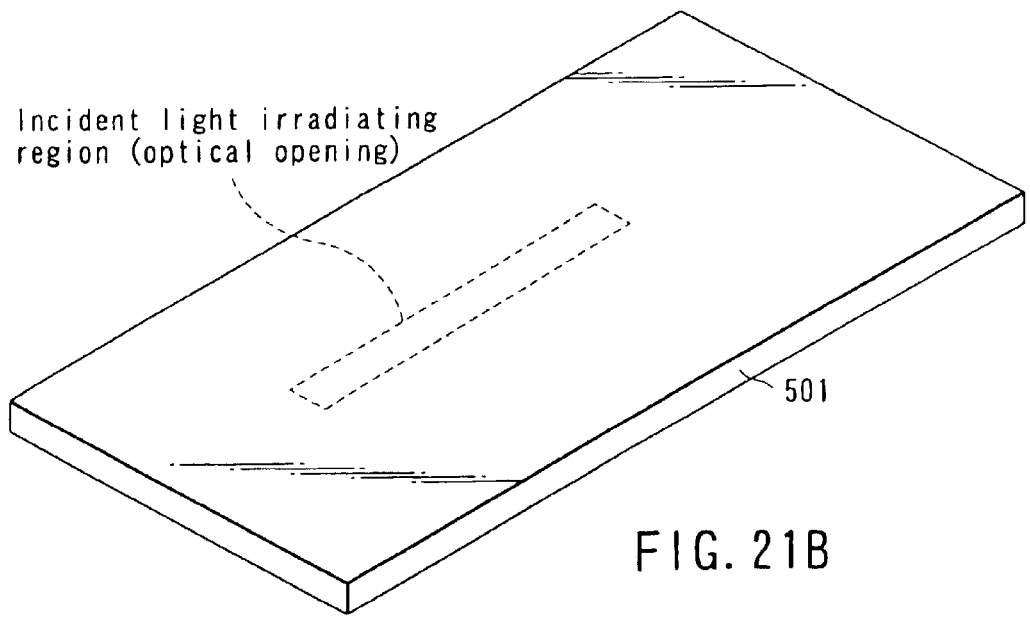

FIGS. 21A and 21B are perspective views of an upper face and a lower face showing the structure of an upper substrate 501 according to the fourth embodiment of the present invention.

The structure of this top substrate 501 is similar to that of the top substrate 103 of the first embodiment, but different in that a quartz substrate 501 is used as the substrate and the slit-like opening portion 104 is omitted.

Because no electrode is formed in a region irradiated with incident light if the substrate is constructed of a transparent quartz, the incident light can reach the intermediate substrate having a reflection surface, without providing with any opening.

A portion indicated by dotted line in FIGS. 21A and 21B is a region through which light enters the flexible thin film.

That is, according to this embodiment, by forming a substrate located in the region irradiated with the incident light of transparent quartz without providing the top substrate with any opening, an optical opening can be secured.

Although in this embodiment, focusing performance is affected by an influence of distortion of the quartz substrate 501, particularly, this embodiment does not suit to high precision applications. However it is preferable for an application demanding for reduction of cost because the manufacturing method can be simplified.

In the meantime, needless to say, any other material may be used instead of quartz as long as it allows light through it.

(Fifth Embodiment)

A fifth embodiment will be described with reference to FIGS. 22A, 22B, 23A and 23B.

This embodiment is different from the first embodiment in the structures of the bottom substrate and the top substrate.

Figure 22A:
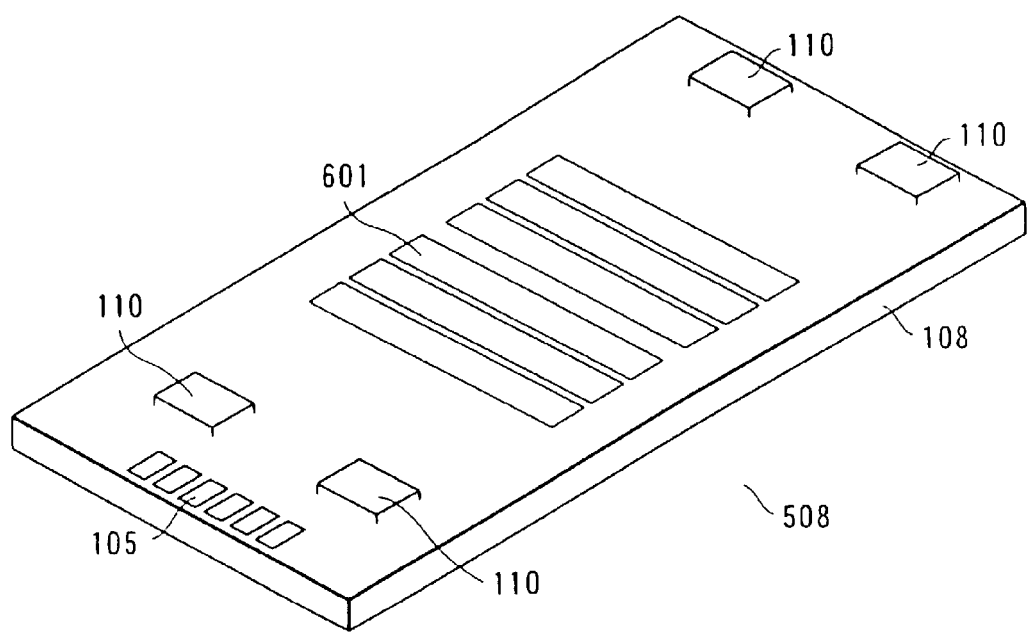
FIGS. 22A and 22B are perspective views of an upper face and a lower face showing a bottom substrate 108 of a variable geometry cylinder mirror according to a fifth embodiment of the present invention.
Figure 22B:
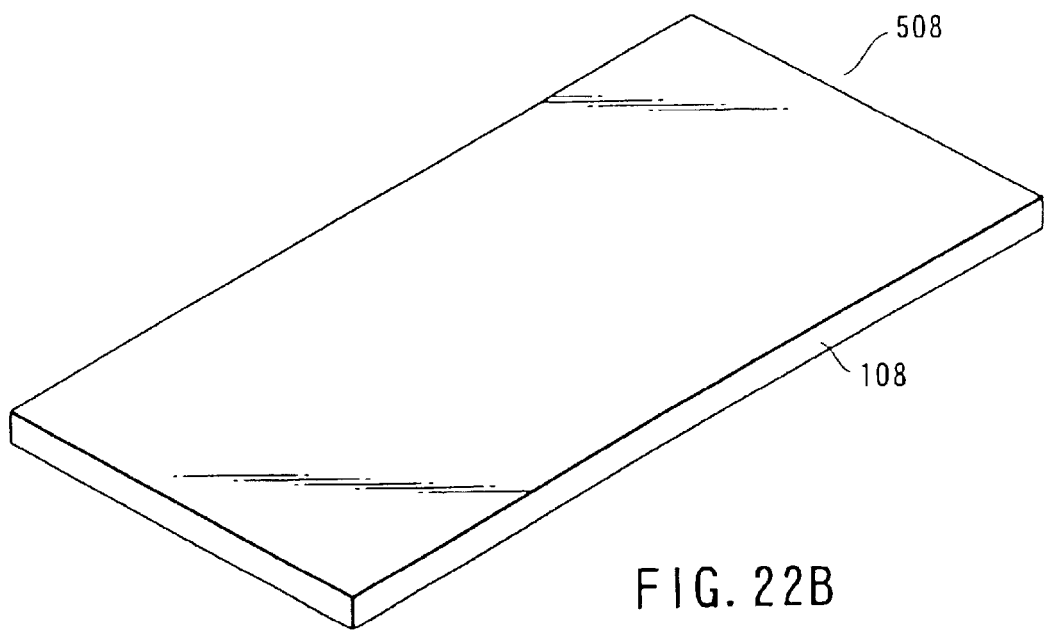

FIGS. 22A and 22B are perspective views of an upper face and a lower face showing the structure of a bottom substrate 508 of a variable geometry cylinder mirror according to the fifth embodiment of the present invention.

According to the first embodiment shown in FIGS. 2A and 2B, no electrode is formed just below a light receiving portion while the lower electrodes 109 are disposed symmetrically on both sides of this region. However, according to this embodiment, top electrodes are formed such that the electrodes on both sides are combined.

Figure 23A:
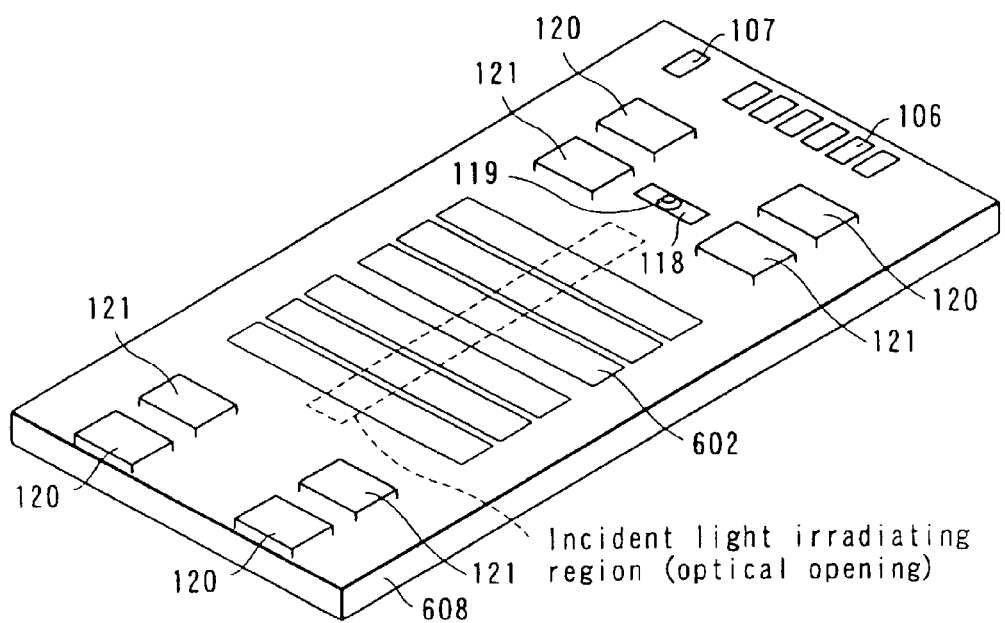
FIGS. 23A and 23B are perspective views of an upper face and a lower face showing a top substrate 608 of the variable geometry cylinder mirror according to a fifth embodiment of the present invention.
Figure 23B:
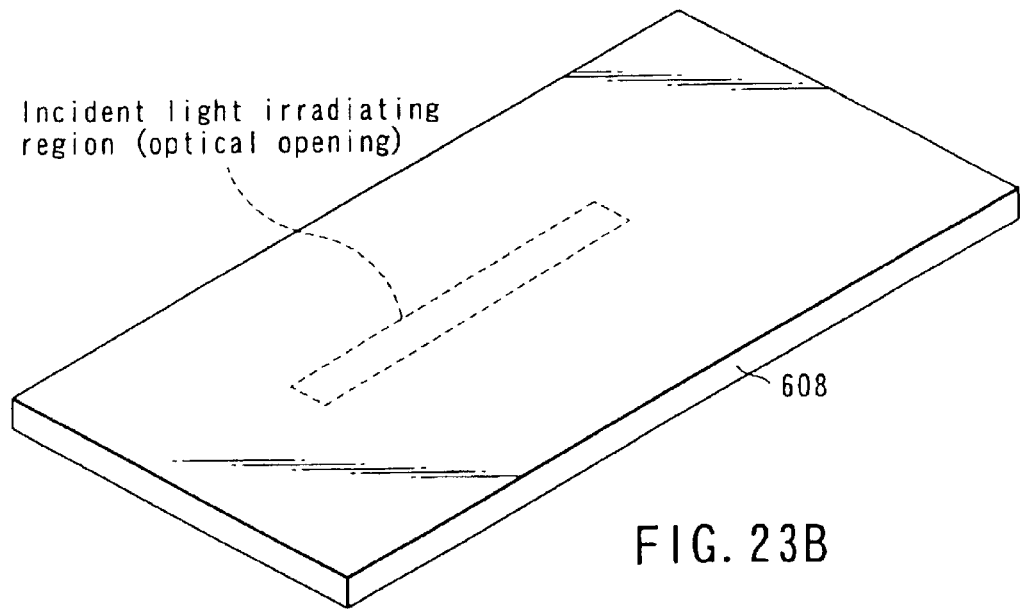

FIGS. 23A and 23B are perspective views of an upper face and a lower face showing the structure of a top substrate 608 of the variable geometry cylinder mirror according to a fifth embodiment of the present invention.

As for the top substrate 608, as shown in FIGS. 23A, and 23B, that substrate is the same transparent quartz substrate 608 same as in the fourth embodiment, the electrode is composed of a transparent ITO and the upper electrodes 602 are disposed on the light receiving portion also.

A portion indicated with dotted line in FIGS. 23A and 23B is a region through which light enters the flexible thin film.

In the same manner as in the fourth embodiment, this embodiment adopts a light transparent material for a substrate and electrodes which light enters and secures an optical opening in order to make light enter into the flexible thin film.

According to this embodiment, a plurality of electrodes are disposed on both faces opposing the flexible thin film on the intermediate substrate. Because the top substrate and the upper electrodes are formed of a transparent material, the electrodes can be disposed just over a light receiving portion of the top substrate.

According to this embodiment, beam path length changes depending on the position of the incident light and focusing performance deteriorate because the quartz substrate 608 and the upper electrodes 602 exist between incident light and a light receiving position. However, this is preferable for a case where the width of the incident light is large or positioning of a variable geometry mirror relative to incident light is difficult.

The problem of the above-described deterioration in focusing performance can be avoided to some extent, if, after the upper electrodes 602 are formed, the top face of the quartz substrate 608 is coated with a dielectric film having substantially the same refractivity as the upper electrodes 602, and this film is flattened.

Although the upper and lower electrodes 602, 601 are symmetrical to the flexible thin film on the intermediate substrate, they may be asymmetrical in the same way, as described in the first embodiment.

For example, if the upper electrode 601 is composed of a single electrode opposing the entire range of the flexible thin film on the intermediate substrate while the electrostatic attracting force applied to the divided lower electrodes is differed according on each position, the flexible thin film can be deformed unevenly.

(Sixth Embodiment)

A sixth embodiment of the present invention will be described with reference to FIGS. 24A, 24B, 25A and 25B.

This embodiment adopts a two-layer structure by omitting the top substrate 103 of the first embodiment.

Its basic operating principle is the same as the above-described embodiment. Although it is incapable of controlling high-precision unevenness in the configuration, this embodiment is more advantageous since the number of electrodes can be reduced.

Figure 24A:
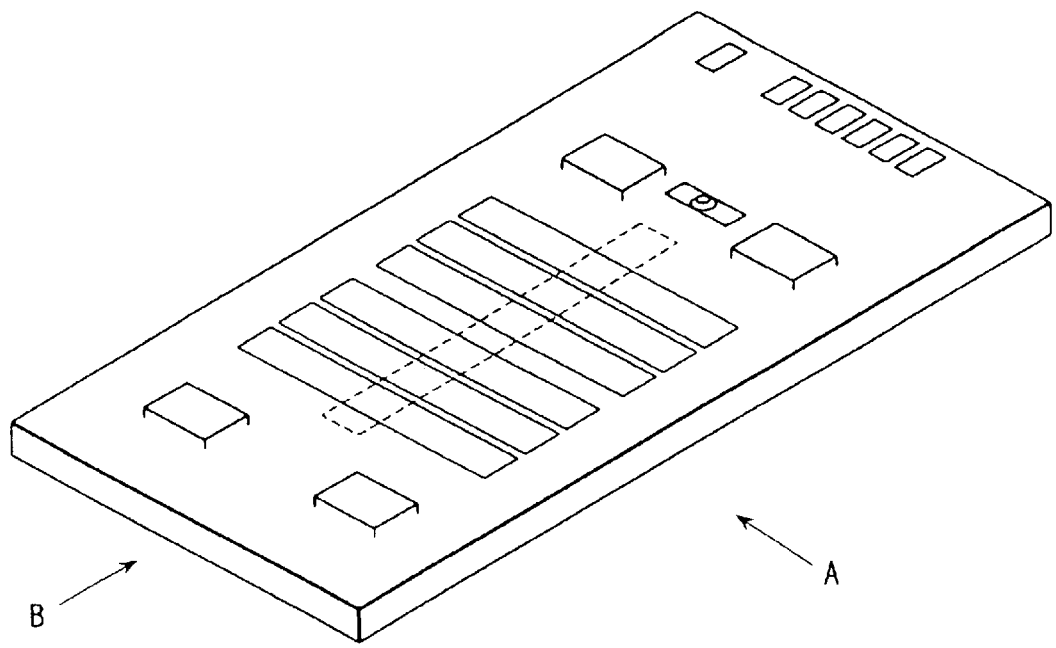
FIGS. 24A and 24B are perspective views of an upper face and a lower face showing a bottom substrate 801 of a variable geometry cylinder mirror according to a sixth embodiment of the present invention.
Figure 24B:
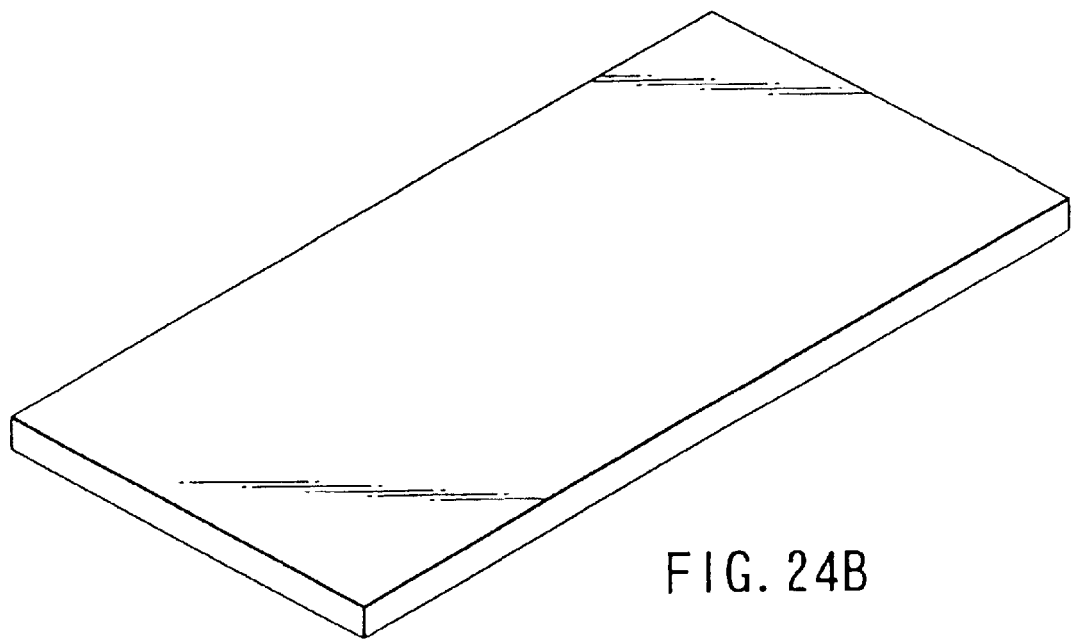

FIGS. 24A and 24B are perspective views of an upper face and a lower face showing the structure of a lower substrate 801 of a variable geometry cylinder mirror according to the sixth embodiment of the present invention.

Figure 25A:
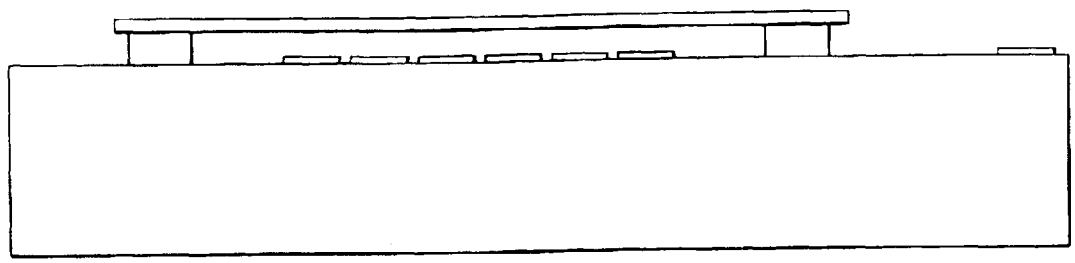
FIGS. 25A and 25B are enlarged views taken in the direction of an arrow A and an arrow B in FIG. 24A.
Figure 25B:
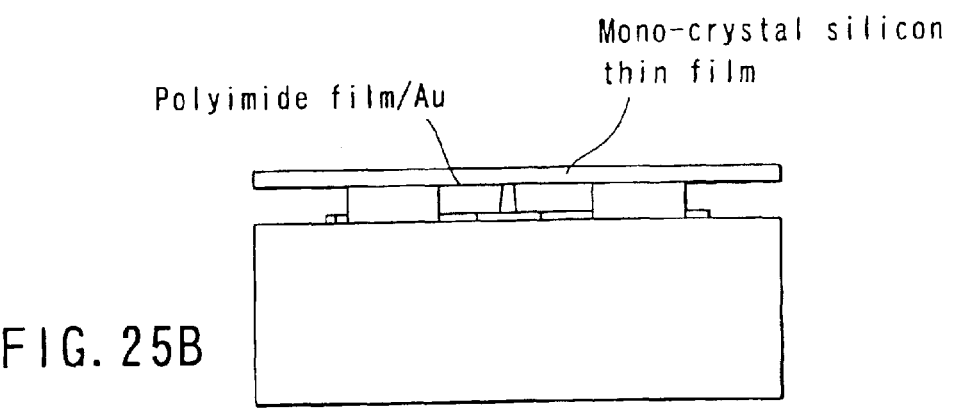
Figure 26:
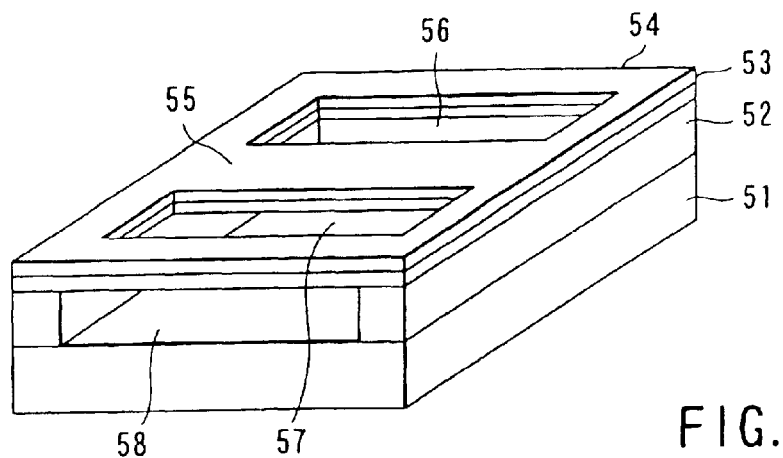
FIG. 26 is a perspective view showing the main structure of a monolithic type reflection mirror unit disclosed in Jpn. Pat. Appln. KOKAI Publication No. 2-101402 as an example of a conventional variable geometry cylinder mirror which is deformed cylindrically.

FIGS. 25A and 25B are enlarged views taken in the direction of arrows A and B in FIG. 24A, indicating the assembly diagram of this embodiment.

These figures are represented in enlargement in the vertical direction to facilitate understanding.

Differences in terms of structure between this embodiment employing the two-layer structure and the three-layer structure of the first embodiment are as follows.

(1) Forming the intermediate substrate electrode lead-out pad on the top substrate and the Au bump formed thereon on the lower substrate.

(2) Connecting the intermediate substrate to the spacer member on the lower substrate.

Because the polyimide film side is joined to the spacer on the lower substrate, the installation direction is reverse to the three-layer structure.

(3) Thus, the Au thin film needs to be deposited on the side of the thin mono-crystal silicon substrate of the intermediate substrate as a reflection surface.

Thus, as described above, the present invention can provide a small variable geometry cylinder mirror which can be changed to a free configuration including an asymmetrical one.

Further, the present invention is capable of providing a variable geometry cylinder mirror which can be changed continuously from the concave face to the convex face and further which can be deformed with the center or any point in its reflection mirror portion fixed.

Further, the present invention can provide a variable geometry cylinder mirror which can obtain large changes in curvature with a relatively low voltage.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A variable geometry cylinder mirror comprising:
    a frame member;
    a flexible thin film in which two end portions opposing each other are supported by said frame member;
    a reflection surface which is provided on said flexible thin film and reflects light;
    a first electrode provided integrally with said flexible thin film; and
    a second electrode substantially fixed to said frame member so as to oppose said first electrode on an opposite side of said reflection surface, the second electrode being divided in the direction connecting said two end portions,
    wherein the configuration of said reflection is controlled to a desired configuration by applying a desired voltage selectively to between said first electrode and said divided second electrode.

2. The variable geometry cylinder mirror according to claim 1, wherein the reflection surface of said flexible thin film is formed of metallic thin film and serves as said first electrode.

3. The variable geometry cylinder mirror according to claim 1, wherein an openings are provided on both sides of said reflection surface in said flexible member across a straight line connecting the end portions supported by said frame member.

4. The variable geometry cylinder mirror according to claim 1, wherein in a region between the end portion supported by said frame member and said reflection surface in said flexible thin film, stiffness thereof in the direction in which said second electrode is divided is reduced.

5. The variable geometry cylinder mirror according to claim 4, wherein the region in which the stiffness of said flexible thin film is reduced is wave-like.

6. The variable geometry cylinder mirror according to claim 5, wherein said flexible thin film is composed of overlaid layers of metallic thin film and silicon nitride or metallic thin film and silicon oxide.

7. The variable geometry cylinder mirror according to claim 4, wherein as for the sectional area of said flexible thin film in a direction perpendicular to the direction in which said second electrode is divided, that of the region in which the stiffness of said flexible thin film is reduced is smaller than that of a region corresponding to said reflection surface.

8. The variable geometry cylinder mirror according to claim 4, wherein an opening or a cutout is provided in the region in which the stiffness of said flexible thin film is reduced.

9. The variable geometry cylinder mirror according to claim 1, wherein said flexible thin film is composed of overlaid layers of metallic thin film and polymer material thin film.

10. The variable geometry cylinder mirror according to claim 7, wherein said flexible thin film is composed of overlaid layers of metallic thin film and polymer material thin film.

11. The variable geometry cylinder mirror according to claim 8, wherein said flexible thin film is composed of overlaid layers of metallic thin film and polymer material thin film.

12. The variable geometry cylinder mirror according to claim 1, wherein said flexible thin film having said frame member, said reflection surface and said first electrode is manufactured by:

a diffused layer forming step of forming a diffused layer having a predetermined shape of a conductive type in a first main face of a mono-crystal silicon substrate of another conductive type;

a thin film laminating step of laminating a thin film on the first main face of the mono-crystal silicon substrate;

an etching step of, with a predetermined voltage applied to the diffused layer of said conductive type, carrying out electrochemical etching from a second main face in an etching solution; and cutting and separating step of cutting and separating frame-like mono-crystal silicon which is part of said mono-crystal silicon substrate form portions corresponding to said flexible thin film and said frame member.

13. The variable geometry cylinder mirror according to claim 5, wherein said flexible thin film having said frame member, said reflection surface and said first electrode is manufactured by:

a groove forming step of forming parallel grooves in a first main face of a flat substrate;

a thin film forming step of forming a thin film on the first main face of said substrate;

an etching step of etching until the thin film formed in said thin film forming step is exposed from a second main face of said substrate; and a cutting and separating step of cutting and separating a fame-like portion which is part of said substrate from portions corresponding to said flexible thin film and said frame member.

* * * * *